(12) United States Patent
Okamoto et al.

(10) Patent No.: US 6,731,876 B1
(45) Date of Patent: May 4, 2004

(54) PACKET TRANSMISSION DEVICE AND PACKET TRANSMISSION SYSTEM

(75) Inventors: Satoru Okamoto, Tokyo (JP); Ken-ichi Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/253,458

(22) Filed: Feb. 22, 1999

(30) Foreign Application Priority Data

Feb. 23, 1998 (JP) .......................................... 10-039912

(51) Int. Cl.[7] .......................... H04J 4/00; H04J 14/08; H04J 3/16; H04J 3/02; H04L 12/28
(52) U.S. Cl. ........................ 398/75; 398/98; 370/539; 370/541; 370/466; 370/395.52
(58) Field of Search ............................ 398/54, 75, 98; 370/466, 467, 907, 916, 506, 535, 395.51, 395.5, 395.2, 465, 469, 474, 539, 541

(56) References Cited

U.S. PATENT DOCUMENTS

| | | | | |
|---|---|---|---|---|
| 5,490,142 A | * | 2/1996 | Hurlocker ................ 370/465 |
| 5,682,257 A | * | 10/1997 | Uchida ................. 359/118 |
| 5,739,934 A | * | 4/1998 | Nomura et al. ........... 359/124 |
| 5,880,864 A | * | 3/1999 | Williams et al. ........... 359/124 |
| 5,903,367 A | * | 5/1999 | Moore ................... 359/110 |
| 5,923,653 A | * | 7/1999 | Denton .................. 370/375 |
| 6,094,442 A | * | 7/2000 | Okamoto et al. .......... 370/506 |

FOREIGN PATENT DOCUMENTS

| | | |
|---|---|---|
| JP | 4-330834 | 11/1992 |
| WO | WO 94/03004 | 2/1994 |

OTHER PUBLICATIONS

"Proceedings of the 1997 communications society conference of IEICE", 1997.

* cited by examiner

Primary Examiner—Leslie Pascal
Assistant Examiner—Dalzid Singh
(74) Attorney, Agent, or Firm—Kenyon & Kenyon

(57) ABSTRACT

The present invention discloses a packet transmission device and a packet transmission system which can realize high-capacity communication. The transmission device transmits packets over a wavelength division multiplexing (WDM) link by mapping the packets into an optical path signal directly without any other medium such as an SDH path. The present invention also discloses a packet transmission device and a packet transmission system which can realize high-capacity communication over an SDH transmission link by mapping the packets directly into an SDH section payload without adding any VC path overhead in order to use the entire SDH section payload area.

9 Claims, 21 Drawing Sheets

PACKET TRANSMISSION DEVICE AND PACKET TRANSMISSION SYSTEM

BACKGROUND OF THE INVENTION

1. Field of the Invention

The present invention generally relates to a packet transmission device and a packet transmission system each of which realizes communication by exchanging packets as basic units of the communication, and, more particularly, to a packet transmission device and a packet transmission system each of which uses IP packets, which are used in communication by using the Internet Protocol (IP). The packet transmission device and the packet transmission system are applicable to an IP network, and are used to connect IP routers located in different places.

2. Description of the Related Art

Recently, WDM (Wavelength Division Multiplexing) transmission technologies are becoming widely available for the purpose of heavily increasing network capacity. In addition, the WDM transmission technologies are becoming available for transmitting IP packets. Conventionally, in order to transmit an IP packet by using the WDM transmission technologies, it is required to map the IP packet into an SDH (Synchronous Digital Hierarchy) path first, and then a SDH path signal needs to be transmitted by a WDM transmission signal. Therefore, in order to transmit an IP packet by using the WDM transmission technologies, as shown in FIG. 18, packet transmission devices 1,3,5 and SDH transmission devices 7,9 are necessary.

As to other methods for transmitting the IP packet, an ISDN (Integrated Services Digital Network) and a leased line are widely used. For realizing a high-capacity transmission of the IP packet, an IP packet transmission device which implements a technology called IP-over-SDH, in which technology the IP packet is mapped into an SDH path payload area, is utilized. The IP-over-SDH technologies are completely described in the RFC1619 by the IETF.

In the following, an overview of the IP-over-SDH technologies will be described with reference to FIG. 19 to FIG. 21.

As shown in FIG. 19, IP routers which are located in different places are connected via an SDH transmission network. In the network, IP packets which are assembled in a destination batch are accommodated in an SDH path payload area and an SDH path signal is transmitted. For example, SDH paths are established between an IP router 1201 and each of IP routers 1202–1204.

An SDH signal, which is configured by multiplexing a plurality of SDH path signals, is transmitted over a transmission line from an IP router, and routed in a batch of the SDH path signals at SDH cross-connect devices, and then transmitted to its destination. 7 types of SDH path signals are defined as VC-11, VC-12, VC-2, VC-3, VC-4, VC-4-4c and VC-4-16c (VC is an acronym for Virtual Container). The capacities of the types are 1.6 Mb/s, 2.2 Mb/s, 6.8 Mb/s, 49 Mb/s, 150 Mb/s, 599 Mb/s and 2396 Mb/s respectively. Therefore, if a high-capacity is required between endpoints, VC-3, VC-4, VC-4-4c or VC-4-16c may be used.

An IP router which implements conventional IP-over-SDH technologies generally has a part which processes routing and an interface part for interfacing between the IP router and an outgoing line. The interface part converts IP data into SDH data and converts SDH data into IP data.

A configuration of an IP/STM converter in the interface part will be described with reference to FIG. 20 (STM is an acronym for Synchronous Transport Module). IP packets divided into 3 groups by destinations are entered into IP/VC converters 1331–1333 through IP packet input lines 1301–1303. In the IP/VC converter 1331, first, IP packets are accommodated in an SDH path payload, and second, overhead data entered through an SDH path overhead data input line 1341 and other overhead data generated in the IP/VC converter 1331 are added to the SDH path payload, and, as a result, an SDH path signal, which is called a Virtual Container (VC) signal, is formed and output over an output line 1351. VC signals from the IP/VC converters 1331–1333 are accommodated into an SDH section payload after being multiplexed by a VC multiplexing circuit 1322. An STM signal is formed by adding overhead data to the SDH section payload in an SDH section overhead inserting circuit 1323, and the STM signal is sent out over the line 1311.

In an STM/IP converter, as shown in FIG. 21, first, each VC signal is extracted from an STM signal in an STM/VC converter 1421, and second, IP packets are extracted from SDH path payloads in VC/IP converters 1431–1433. Then the IP packets are sent to the inside of the IP router (1411–13).

As another technology in which packets are accommodated into an SDH section payload area, the international publication WO94/03004 (PCT/EP93/01675) "Local or/and Transit Exchange for a Broadband Communication Network" discloses technologies in which a packet of fixed length (normally called an ATM cell) which is used in an ATM (asynchronous transfer mode) network is accommodated into an SDH section payload area. According to the technologies, the ATM cell is accommodated into the SDH section payload area by way of a VC signal.

However, the above conventional technologies have the following disadvantages. First, in the above conventional WDM technology, because the IP packets should be transmitted via the SDH path, overhead data of the SDH path signal should be transmitted also. Therefore, the transmission capacity of an optical path cannot be fully used, and expensive devices for performing the SDH path transmission are necessary.

Second, in the above conventional IP-over-SDH technology, because the IP packets are transmitted over the SDH path signal, there is an advantage that an IP packet transmission device can transmit the IP packets to a plurality of destinations by connecting one transmission line to the IP packet transmission device. From the viewpoint of the transmission capacity, however, because a part of the transmission capacity is consumed by transmission of the SDH path overhead, the transmission capacity of the transmission line cannot be fully used. Therefore, some problems such as a cost increase of the transmission line may arise for realizing high-capacity communication which is required recently. Further, when the destination of the IP packets is limited to only one, because it is not necessary to have SDH paths, the SDH path overhead area is not used, and, as a result, the overhead part of the transmission capacity is wasted. Further, because an SDH cross-connect system which handles VC-4-4c and/or VC-4-16c is not yet in actual use, it is necessary to establish a plurality of SDH paths between the same endpoints for realizing a high-capacity communication beyond VC-4 (150 Mb/s).

Third, according to the technologies disclosed in the international publication WO94/03004 (PCT/EP93/01675), packets are accommodated into the SDH section payload area by way of VC signal. Therefore, the SDH section payload area should have information used only for handling the VC signal, so a part of the transmission capacity is wasted as in the case mentioned above.

SUMMARY OF THE INVENTION

It is a general object of the present invention to provide a packet transmission device and a packet transmission system which can realize high-capacity communication by transmitting packets over a wavelength division multiplexing (WDM) link without any SDH path. It is another object of the present invention to provide a packet transmission device and a packet transmission system which can realize high-capacity communication by eliminating waste of the SDH path overhead area in the case of SDH transmission. It is more specific object of the present invention to provide a packet transmission device and a packet transmission system which is applicable to an IP network.

The above objects of the present invention are achieved by a circuit for converting packets into an optical path signal, wherein the circuit is used in a transmission device for transmitting packets, the circuit including:
- a part for converting the packets into a plurality of data streams:
- a part for multiplexing the data streams; and
- a part for generating the optical path signal by adding at least one overhead to the multiplexed data streams.

The above objects of the present invention are also achieved by a circuit for converting packets into an optical path signal which is used for wavelength division multiplexing (WDM) transmission, wherein the circuit is used in a transmission device for transmitting packets, the circuit including:
- a part for converting the packets into a plurality of data streams by using at least one data link layer process;
- a part for multiplexing the data streams by using at least one interleaving process and for generating data which is a unit of the wavelength division multiplexing (WDM) transmission; and
- a part for generating the optical path signal by adding at least one overhead which is necessary for the wavelength division multiplexing (WDM) transmission to the data.

The above objects of the present invention are also achieved by a circuit for converting an optical path signal into packets, wherein the circuit is used in a transmission device for transmitting packets, the circuit including:
- a part for separating at least one overhead from the optical path signal;
- a part for generating data streams by demultiplexing data of the optical path signal without the overhead; and
- a part for extracting the packets from the data streams.

The above objects of the present invention are also achieved by a circuit for converting an optical path signal which is used for wavelength division multiplexing (WDM) transmission into packets, wherein the circuit is used in a transmission device for transmitting packets, the circuit including:
- a part for separating at least one overhead which is necessary for the wavelength division multiplexing (WDM) transmission from the optical path signal;
- a part for generating data streams by demultiplexing data of the optical path signal without the overhead; and
- a part for extracting the packets from the data streams by using at least one data link layer process.

According to the above inventions, because packets are transmitted directly over the optical path signal and there is no need to establish SDH paths, high-capacity communication can be realized.

The above objects of the present invention are also achieved by a transmission device for transmitting packets, the transmission device including:
- a part for converting the packets into an optical path signal and for sending the optical path signal by using wavelength division multiplexing (WDM); and
- a part for converting the optical path signal which is received into the packets.

The above objects of the present invention are also achieved by a transmission device for transmitting packets by converting the packets into an optical path signal, the transmission device including:
- a packet mapping part for mapping a plurality of packets into an entire payload area of the optical path signal; and
- a packet retrieving part for extracting each packet from the payload area.

According to the above inventions, because packets are transmitted directly over the optical path signal and there is no need to establish SDH paths, high-capacity communication can be realized.

The above objects of the present invention are also achieved by a transmission system for transmitting packets, the transmission system including:
- a plurality of transmission devices each of which comprises a part for converting the packets into an optical path signal and for sending the optical path signal by using wavelength division multiplexing (WDM), and a part for converting the optical path signal into the packets; and
- a part for establishing a connection between said transmission devices by using the optical path signal.

The above objects of the present invention are also achieved by a transmission system for transmitting packets, the transmission system including:
- a plurality of transmission devices each of which comprises a packet mapping part for mapping a plurality of packets into an entire payload area of an optical path signal and a packet retrieving part for extracting each packet from the payload area; and
- a part for establishing a connection between the transmission devices by using the optical path signal.

According to the above inventions, because packets are transmitted directly over the optical path signal and there is no need to establish SDH paths, high-capacity communication can be realized with low cost.

The above objects of the present invention are also achieved by a circuit for converting packets into a signal which is a transmission unit in a synchronous digital transmission standard, wherein the circuit is used in a transmission device for transmitting packets, the circuit including:
- a part for converting the packets into a plurality of data streams;
- a part for multiplexing the data streams without adding any overhead for upper layer transmission; and
- a part for generating said signal by adding at least one overhead to the multiplexed data streams.

The above objects of the present invention are also achieved by a circuit for converting packets into an STM signal in SDH transmission, wherein the circuit is used in a transmission device for transmitting packets, the circuit including:
- a part for converting the packets into a plurality of data streams by using at least one data link layer process;

a part for multiplexing the data streams by using at least one interleaving process without adding any overhead of a VC signal and for generating STM data which is a unit of the SDH transmission; and a part for generating the STM signal by adding at least one overhead which is necessary for the SDH transmission to the STM data.

The above objects of the present invention are also achieved by a circuit for converting a signal which is a transmission unit in a synchronous digital transmission standard into packets, wherein the circuit is used in a transmission device for transmitting packets, the circuit including:

a part for separating at least one overhead from said signal;

a part for generating data streams by demultiplexing data of the signal without the overhead; and a part for extracting the packets from the data streams.

The above objects of the present invention are also achieved by a circuit for converting an STM signal in SDH transmission into packets, wherein the circuit is used in a transmission device for transmitting packets, the circuit including:

a part for separating at least one overhead which is necessary for the SDH transmission from the STM signal;

a part for generating data streams by demultiplexing data of the STM signal without the overhead; and a part for extracting the packets from the data streams by using at least one data link layer process.

According to the above inventions, because packets are mapped directly into the STM signal of SDH, the capacity of a transmission line is used more effectively as compared to the conventional IP-over-SDH, and high-capacity communication can be realized.

The above objects of the present invention are also achieved by a transmission device for transmitting packets, the transmission device including:

a part for converting the packets into a signal which is a transmission unit in a synchronous digital transmission standard and for sending the signal by the synchronous digital transmission; and a part for converting the signal into the packets.

The above objects of the present invention are also achieved by a transmission device for transmitting packets by converting the packets into an STM signal, the transmission device including:

a packet mapping part for mapping a plurality of packets into an entire section payload area of the STM signal; and a packet retrieving part for extracting each packet from the section payload area.

The above objects of the present invention are also achieved by a transmission system for transmitting packets, the transmission system including:

a plurality of transmission devices each of which has a part for converting the packets into a signal which is a transmission unit in a synchronous digital transmission standard, a part for sending the signal by the synchronous digital transmission and a part for converting the signal into the packets; and a part for establishing a connection between the transmission devices by using the signal.

The above objects of the present invention are also achieved by a transmission system for transmitting packets, the transmission system including:

a plurality of transmission devices each of which has a packet mapping part for mapping a plurality of packets into an entire section payload area of an STM signal and a packet retrieving part for extracting each packet from the section payload area; and a part for establishing a connection between the transmission devices by using the STM signal.

According to the above inventions, because packets are directly mapped into an SDH section payload, waste of the SDH path overhead area can be eliminated. The elimination is effective especially when the destination of the IP packets is limited to only one.

The packets in the above inventions may be IP packets which are used for realizing a communication by the Internet Protocol.

Therefore, according to the present invention, an IP communication network with high-capacity can be realized, and, for example, an intracorporate IP network can be constructed with low cost. Further, carriers can provide high-speed IP communication services with reasonable prices. Furthermore, the present invention may be a solution for the congested traffic in the backbone of the Internet.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
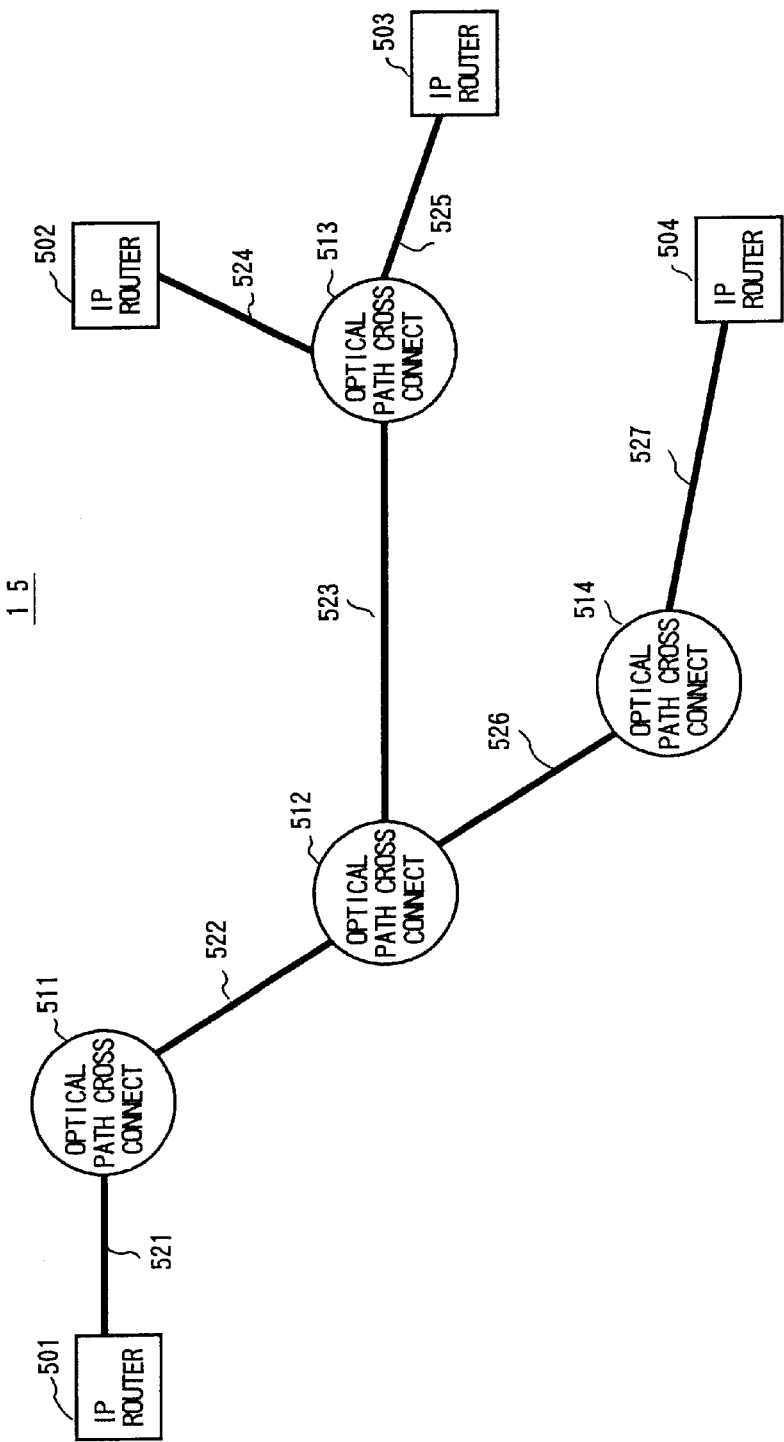
FIG. 1 is a block diagram of an IP packet transmission system according to a first embodiment of the present invention.

In the following, embodiments of the present invention will be described with reference to the accompanying drawings. To begin with, a first embodiment in which IP packets are transmitted over an optical path signal will be described. FIG. 1 is a diagram of a transmission system 15 of the embodiment. In the transmission system, four IP routers 501–504 are connected via four optical-path cross-connect devices 511–514. A transmission line is connected to each of the IP routers, and the each transmission line carries a plurality of optical paths. Each optical path accommodates IP packets of the same destination. Each optical path signal is wavelength-multiplexed, and transmitted over a transmission line. At an optical-path cross-connect device 511–514, the optical paths are cross-connected. On such a optical communication network in which a connection is established by using the optical path as a connection unit, Kenichi Sato, Satoru Okamoto, "-Evolution of path layer techniques toward photonic networks",(IEICE conference, SB-7-1, September 1992) and Kenichi Sato, Hiromu Toba, "Trends of photonic Transport Network technologies" (IEICE, Vol.80, No.9, PP.947–959, September, 1997) and Kenichi Sato, Satoru Okamoto, Hisaya Hadama, "Network performance and integrity enhancement with optical path layer technologies", (IEEE journal on selected areas in communications, Vol.12, No.1, pp.159–170, January 1994) can be referred to. From each of the IP routers 501–504, optical paths directed to the other three IP routers can be established. In this case, at the IP router 501, three optical, paths are sent out over the transmission line 521, and, in the reverse direction, three optical paths are entered from the transmission line 521.

The transmission line 521 is generally an optical fiber, and two optical fibers may be defined as one transmission line or one optical fiber which is used in both directions may be defined as one transmission line. In the present invention, both definitions can be used.

Figure 2:
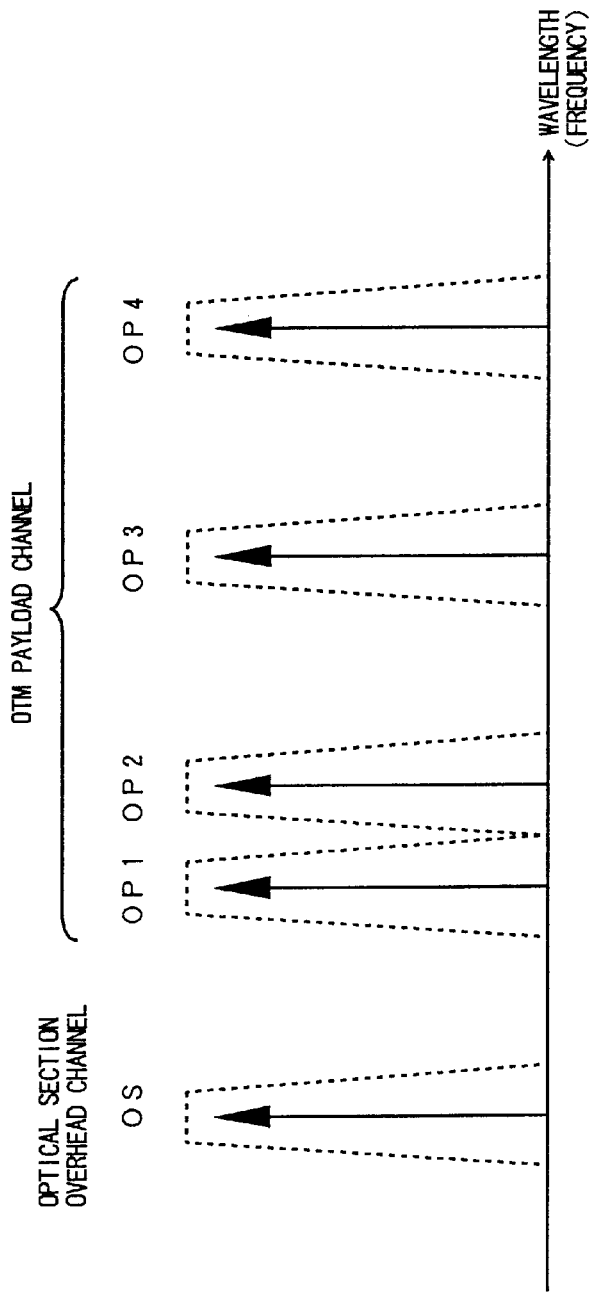
FIG. 2 is a diagram showing a signal transmission format of OTM which is used in an optical path network (OTM is an acronym for Optical Transport Module)

FIG. 2 shows a diagram of an OTM (Optical Transport Module) structure, that is, signal transport format carried by the transmission line. Now, the structure of the OTM carried by the transmission line will be described with reference to FIG. 2. The optical signal consists of an optical section overhead channel (OS) which transports an optical section overhead signal and an OTM payload channel which has a plurality of optical paths (OP1–OP4). In the example shown in the FIG. 2, an OTM signal is configured by wavelength (frequency) multiplexing the four optical paths (OP1–OP4) and one optical section overhead channel (OS).

Figure 3:
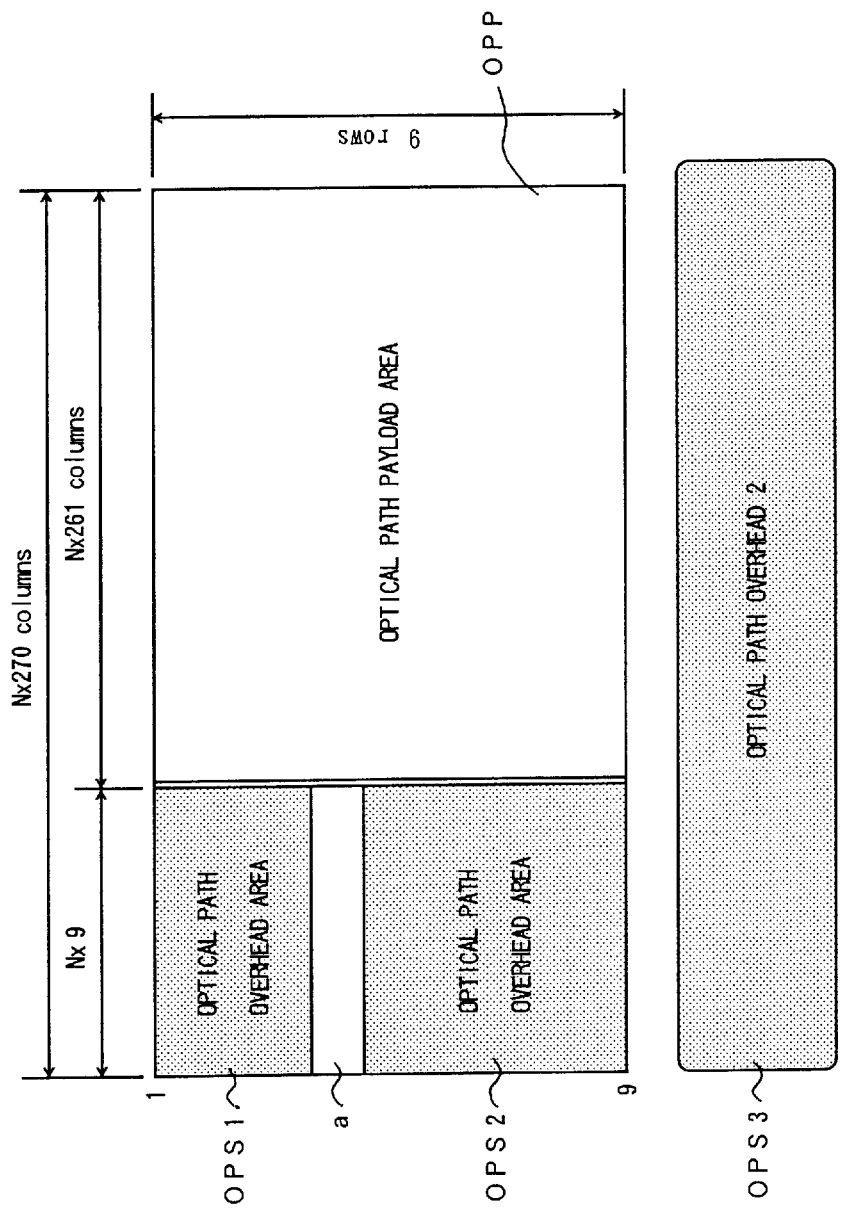
FIG. 3 is a diagram of a format of an optical path signal.

A format of an optical path signal is shown in FIG. 3. The optical path signal, in the embodiment, consists of a data stream of 9×(270×N)bytes, the size of which is the same as that of STM-N of SDH to be described later, and an optical path overhead (OPS3) which is added to the data stream. The data stream consists of an optical path overhead area OPS1 (3×(9×N) bytes), an optical path overhead area OPS2 (5× (9×N) bytes), an AU pointer area "a" (1×(9×N) bytes) and an optical path payload area OPP (9×(261×N) bytes).

The optical path overhead OPS3 may be added by technologies such as modulation of a pilot tone and optical CDMA, but the optical path overhead OPS3 may not be used in some cases. The format of the optical path signal is not limited to the one mentioned above, and can take various structures. The present invention may be applicable to any format.

Satoru Okamoto, "Network node interface structure for WDM optical path transport networks," (IEICE, Society conference, B-10-98, September 1997) and Satoru Okamoto, Kenichi Sato, "Inter-network interface for photonic transport networks and SDH transport networks",(IEEE GLOBECOM'97, pp.850–855, November, 1997) illustrate details on the OTM signal and the format of the optical path signal described here.

In the transmission system 15, as will be described later, each IP router maps IP packets into the payload area, sends out the payload as an optical path signal, and extracts IP packets from the optical path signal at a receiving end. Therefore, in the transmission system 15, an optical path transmission line can be used effectively and a high-capacity communication can be realized, because there is no need to transmit an overhead of SDH. Further, a cost reduction can be realized, because there is no need to send IP packets via SDH paths and no need to provide devices for SDH.

Figure 4:
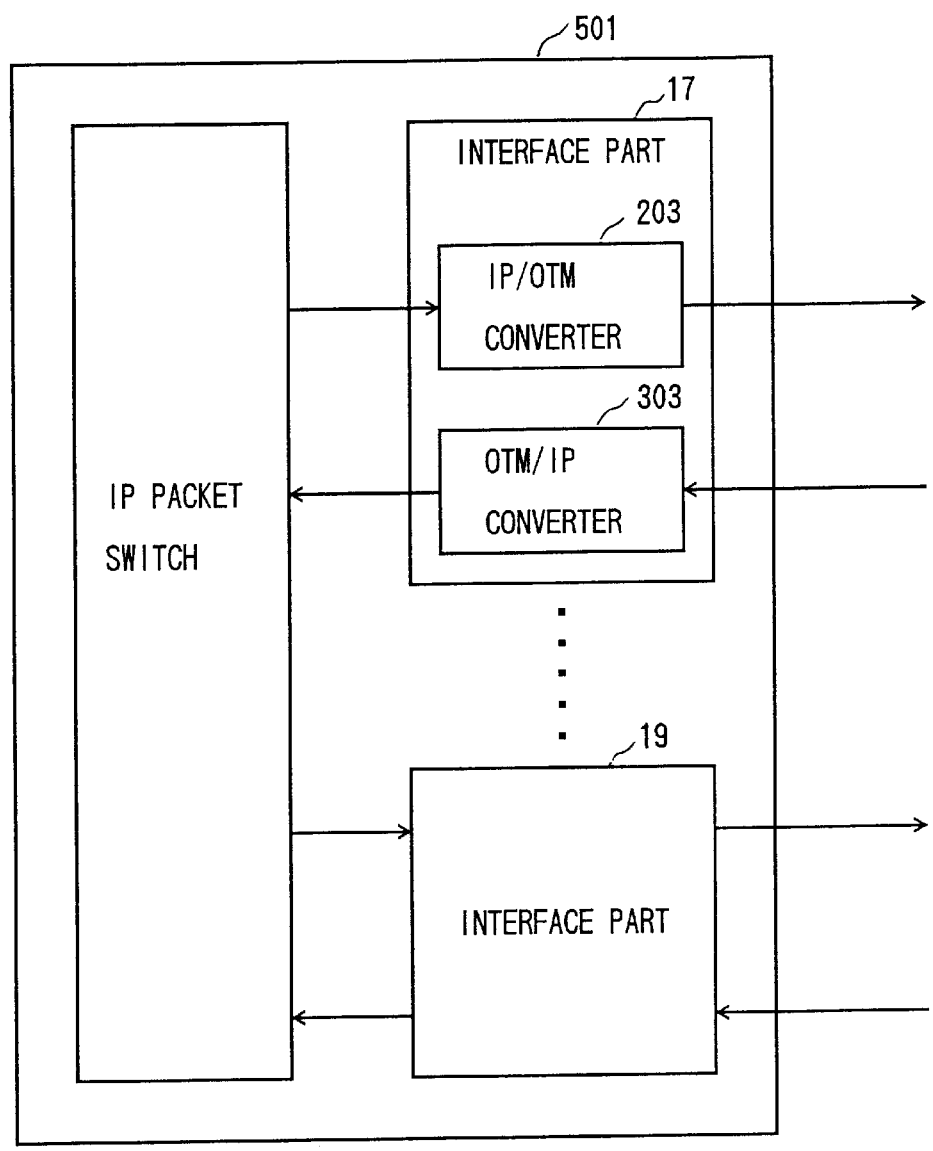
FIG. 4 is a block diagram of an IP packet transmission device according to the first embodiment of the present invention.

In the following, an example of the IP router 501 according to the embodiment of the present invention will be described with reference to FIG. 4. As shown in FIG. 4, the IP router 501 includes an IP packet switch for routing IP packets and interface parts 17, 19 which are connected to lines and are for input/output of IP packets. Also the IP router 501 has a control part for controlling various parts, a power supply part for supplying power and so on, which are not shown in FIG. 4. Interface parts 17, 19 can be configured to process various signals. In the embodiment here, the interface part 17 has a function for input/output of IP packets over OTM signals, or equivalently, the interface part 17 is connected to the transmission line 521. The interface part 19, for example, may have a function for input/output of IP packets over ATM. In the following, the operation of IP router 501 will be described.

When an OTM signal is entered into the interface part 17, an OTM/IP converter 303 in the interface part 17 converts the OTM signal into IP packets, and sends the IP packets to the IP packet switch. The IP packet switch determines routes of the IP packets, and sends them to appropriate interface parts. If one of the interface parts is the interface part 17, the IP packet is sent out over an OTM signal from an IP/OTM converter 203.

Figure 5:
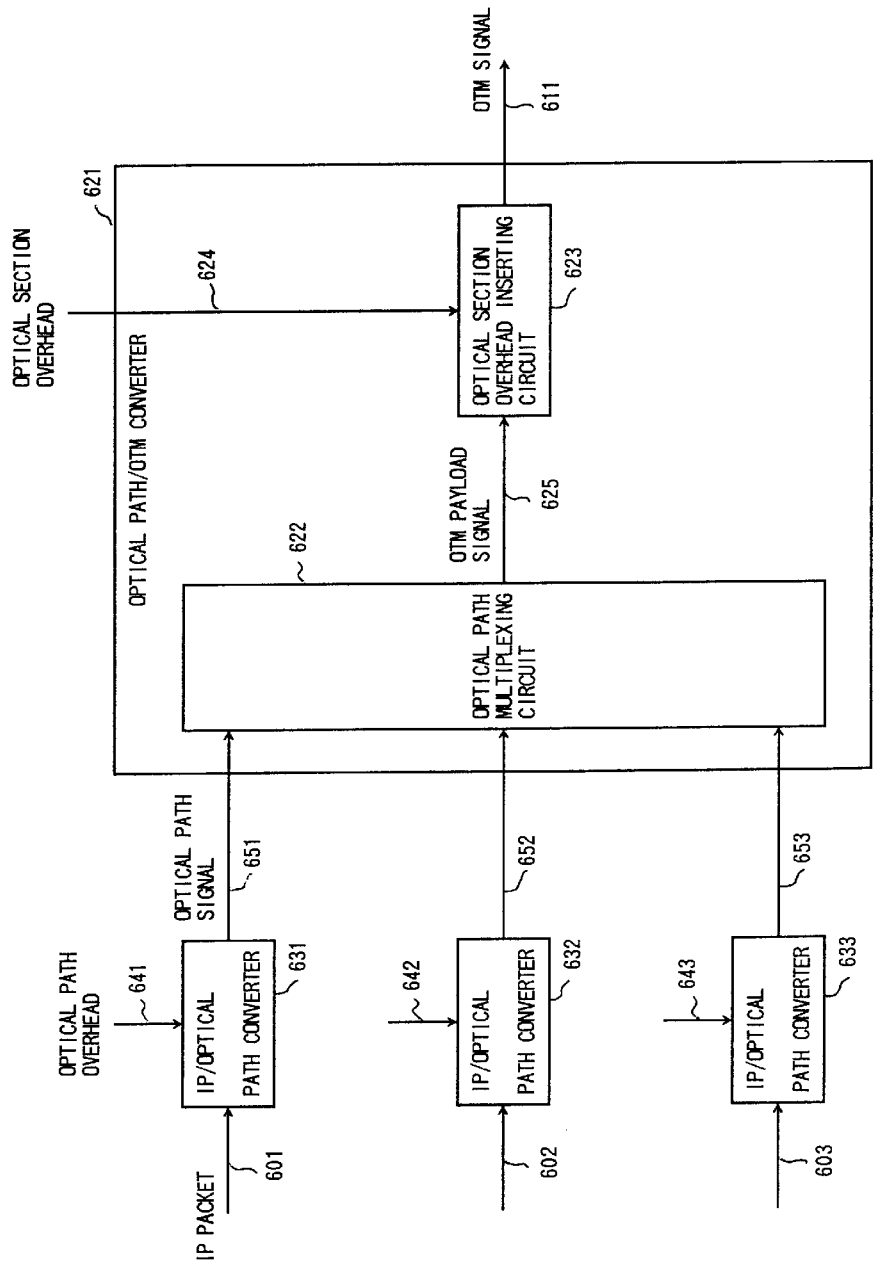
FIG. 5 is a block diagram of an IP/OTM converter of an IP router according to the first embodiment of the present invention.

FIG. 5 is a block diagram of the IP/OTM converter 203. The description of the IP/OTM converter 203 will be shown in the following with reference to the FIG. 5. In this configuration, IP packets which are classified by their destinations (there are three destinations here) are entered into an IP/Optical path converters 631–633 via IP packet input lines 601–603, and are accommodated into optical path payloads OPP. In the IP/Optical path converters 631–633, optical path overheads from optical path overhead input lines 641–643 are added to the optical path payloads OPP. As a result, optical path signals are configured, and sent out over optical path signal output lines 651–653. Then, the optical path signals are entered into an optical path/OTM converter 621. The entered optical path signals are wavelength (frequency) multiplexed in an optical path multiplexing circuit 622. Then OTM payload signal is formed.

Subsequently, optical section overhead channel signals from an optical section overhead data input line 624 are added to the OTM payload signal in an optical section overhead inserting circuit 623, and then an OTM signal is completed. The completed OTM signal is sent out to a transmission line via an OTM signal output line 611.

Figure 6:
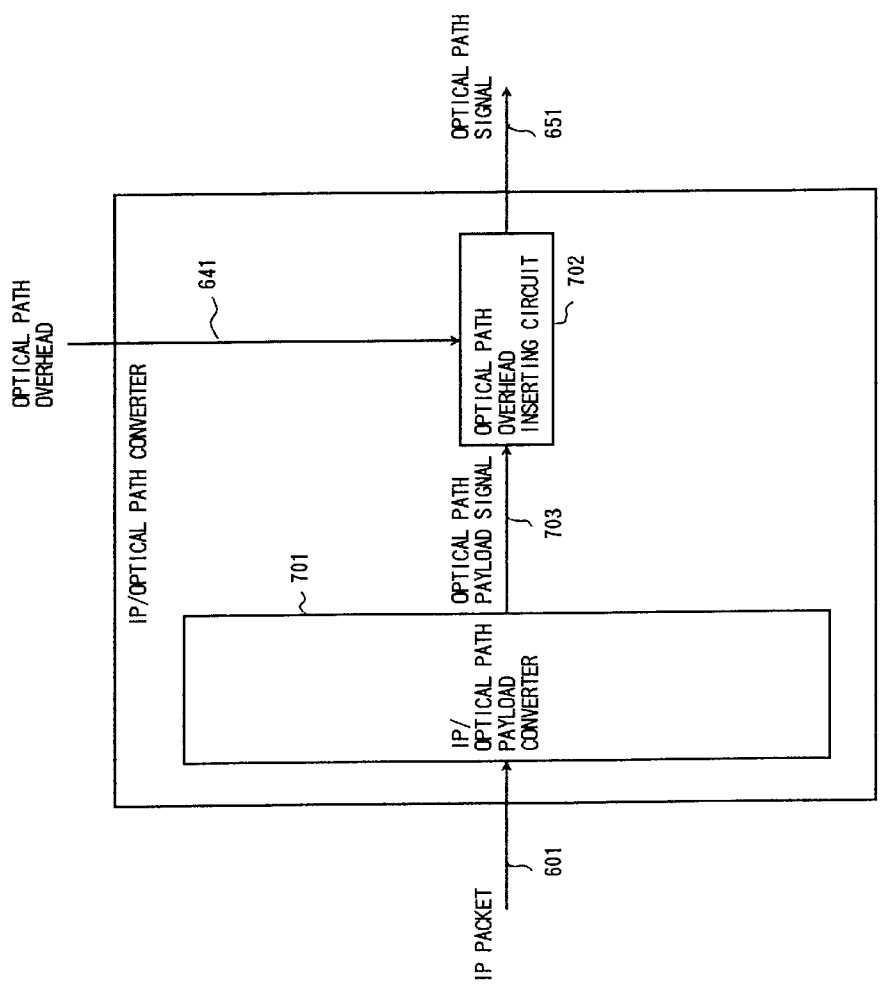
FIG. 6 is a block diagram of an IP/Optical path converter of an IP router according to the first embodiment of the present invention.

In the following, an example of the IP/Optical path converter 631 will be described with reference to FIG. 6. FIG. 6 shows a part corresponding to the IP/Optical path converter 631. An IP packet entered from the IP packet input line 601 is accommodated into an optical path payload by an IP/Optical path payload converter 701, and then the optical path payload is sent out to an optical path payload output line 703.

Next, optical path overhead areas OPS1, OPS2 and an AU pointer (a) are added to the optical path payload by an optical path overhead inserting circuit 702. Further, an optical path overhead area OPS3 may be added to the optical path payload, and then an optical path signal is completed and sent out to the optical path signal output line 651.

Figure 7:
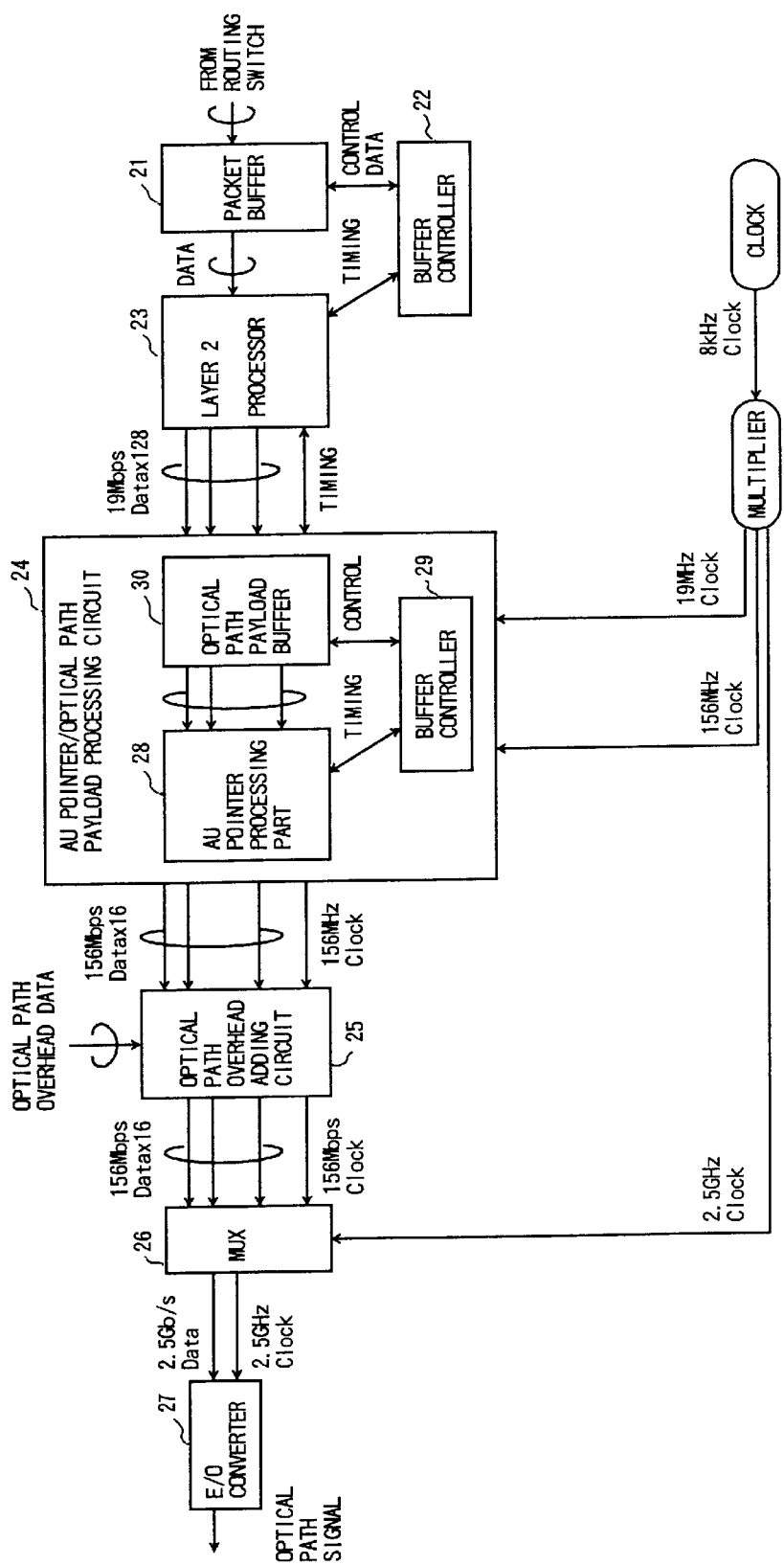
FIG. 7 is a block diagram showing a configuration of the IP/Optical path converter.

FIG. 7 shows the IP/Optical path converter 631 in detail. As shown in FIG. 7, the IP/Optical path converter 631 has a packet buffer 21, a buffer controller 22, a layer-2 processor 23, an AU pointer/Optical path payload processing circuit 24, an optical path overhead adding circuit 25, a MUX 26, and an E/O converter 27. The packet buffer 21, the buffer controller 22, the layer-2 processor 23 and the AU pointer/Optical path payload processing circuit 24 correspond to the IP/Optical path payload converter 701 in FIG. 6. The IP/Optical path converter 631 can be realized by one or more integrated circuits. The operation will be described below.

IP packets entered from the routing switch are written in the packet buffer 21, and processes of layer-2 are performed one after another. The buffer controller 22 controls the rate at which the IP packets are read out from the packet buffer 21 to the layer-2 processor 23. A plurality of layer-2 processors are provided according to the processing power and the rate of the optical path signal. In this embodiment, the data processed by the layer-2 processor 23 is entered into the AU pointer/Optical path payload processing circuit 24 at the rate of 19 Mbps×128. The layer-2 processes will be described in detail below.

An IP packet is variable-length data, and the IP packets may arrive successively with irregular intervals. In contrast, the optical path payload is a continuous data stream. Therefore, a method is necessary to provide dummy data which fill in intervals between IP packets and marks which delimit continuous IP packets. The method is the layer-2 processes, and, in the embodiment, IP packets are converted into a stream of PPP (Point-to-Point Protocol) frames.

The PPP is illustrated in the RFC 1661 "The Point-to-Point Protocol (PPP)" defined by IETF. In the PPP, a PPP header (4 bytes) and a PPP trailer (2 bytes) are added to an IP packet to form a data stream called a PPP frame. The PPP trailer is used for detecting an error of the PPP frame data.

On the contrary, to extract an IP packet from the PPP frame, the PPP header and the PPP trailer are removed from the PPP frame. Therefore, in the layer-2 processing, only PPP frames are extracted by finding out the breakpoints of the PPP frames in the optical path payload. For this purpose, it is defined that the interval between PPP frames must be filled in with data strings more than 1 byte length which include "7E" in hexadecimal notation or "01111110" in binary notation. The "7E" in hexadecimal notation is characterized in that it includes six consecutive "1"s in binary notation.

Therefore, in a data stream of a payload, the head of a PPP frame can be recognized by detecting data which does not have the six consecutive "1"s, and the end of a PPP frame can be recognized by detecting the six consecutive "1"s. If there is a need to send data which includes the six consecutive "1"s, "0" is inserted after five consecutive "1"s when the PPP frame is generated. In the receiving part of the PPP frame, the "0" after the five consecutive "1" s is deleted.

By performing the above-mentioned processes, it is possible to extract only PPP frames from the optical path payload, because it is guaranteed that there is no data which have six consecutive "1"s. Therefore, IP packets can be mapped into the optical path payload via the PPP frame. The layer-2 processing mentioned above is similarly performed in IP/SDH conversion and SDH/IP conversion which will be described later. The layer-2 process is not limited to the PPP, and various methods are applicable so long as IP packets are converted into continuous data streams by the methods.

Now, referring back to FIG. 7, the description of the IP/Optical path converter will be continued. The AU pointer/Optical path payload processing circuit 24 includes an AU pointer processing part 28, an optical path payload buffer 29 and a buffer controller 30. The optical path payload buffer 30 smoothes out data speed discrepancies between writing in by the layer-2 processor and reading out from the optical path payload buffer 30. If there is no need to do so, the optical path payload buffer 30 is unnecessary. A plurality of optical path payload buffers may be provided according to the processing power, and in the present embodiment, 16 buffers are provided. The buffer controller 29 controls the timing of writing in and reading out at the optical path payload buffer 30. The 16 data groups sent out from the optical path payload buffer 30 are byte-interleave-multiplexed and are provided AU pointers by the AU pointer processing part 28.

156 Mbps×16 parallel data is entered into the optical path adding circuit 25 from the AU pointer/Optical path payload processing circuit 24, optical path overhead data is added to the parallel data, and then the parallel data is converted into 2.5 Gbps serial data at the MUX 26. Finally, optical path signals are sent out after being converted from an electrical signal into an optical signal at the E/O converter 27.

At the input point of the IP router 501, each optical path is separated from an OTM signal, and IP packets are retrieved via an optical path/IP converter. The operation will be described with reference to FIG. 8 and FIG. 9 in the following.

Figure 8:
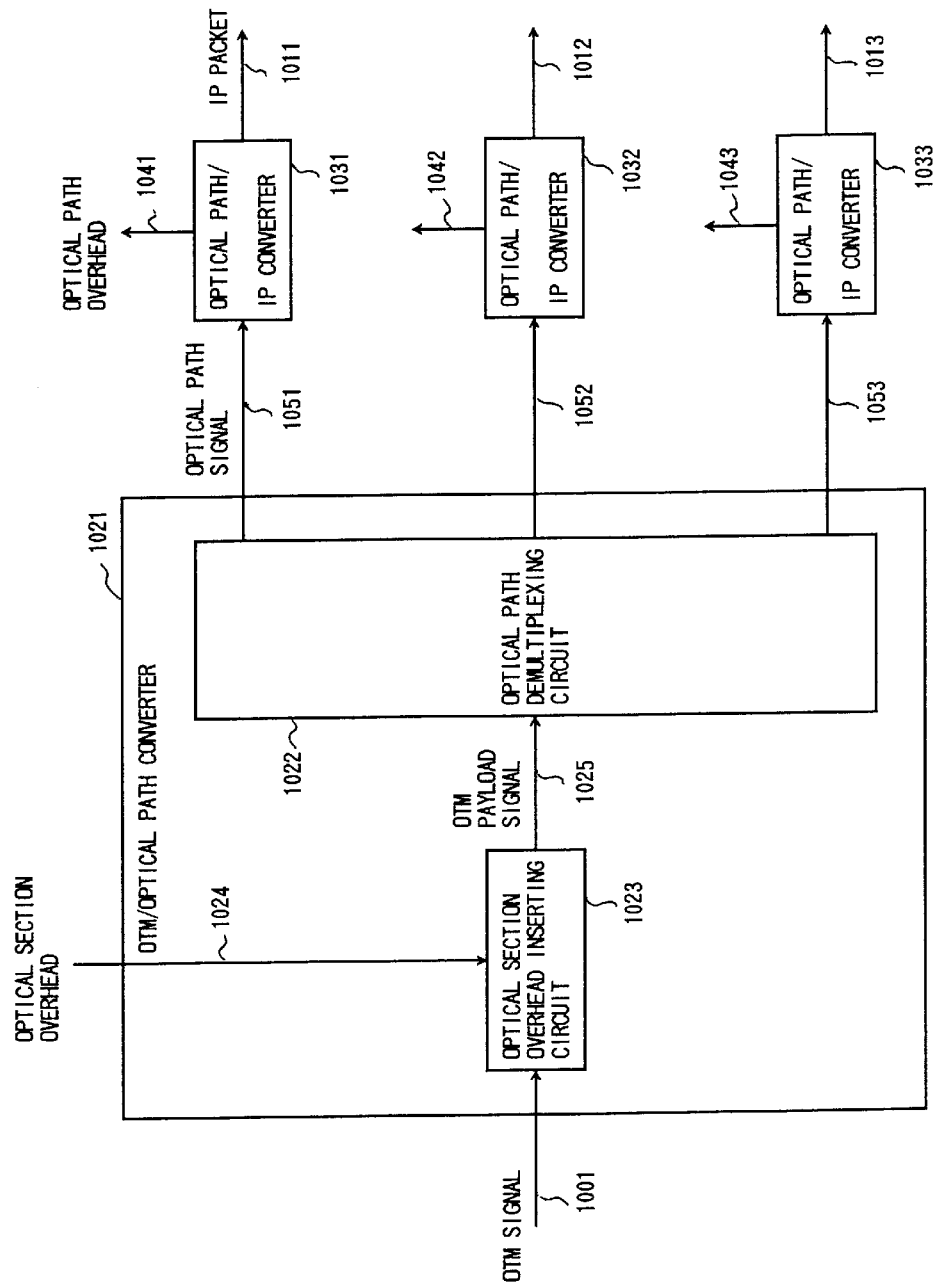
FIG. 8 is a block diagram of an OTM/IP converter of an IP router according to the first embodiment of the present invention.

FIG. 8 shows the OTM/IP converter 303 in the interface part 17 of the IP router 501 shown in FIG. 4. The description on the OTM/IP converter 303 will be shown below with reference to FIG. 8. An OTM signal is entered into an OTM optical path converter 1021 from an OTM signal input line 1001, and after separation of the optical section overhead channel, only the OTM payload signal is sent out to an output line 1025.

Next, the OTM payload signal is wavelength (frequency) demultiplexed into optical path signals in the optical path demultiplexing circuit 1022. The optical path signals are sent out to optical path signal output lines 1051–1053. From the optical path payload areas of the optical path signals, IP packets are extracted by the Optical path/IP converter 1031–1033. Then, the IP packets are sent to IP packet output lines 1011–1013.

Figure 9:
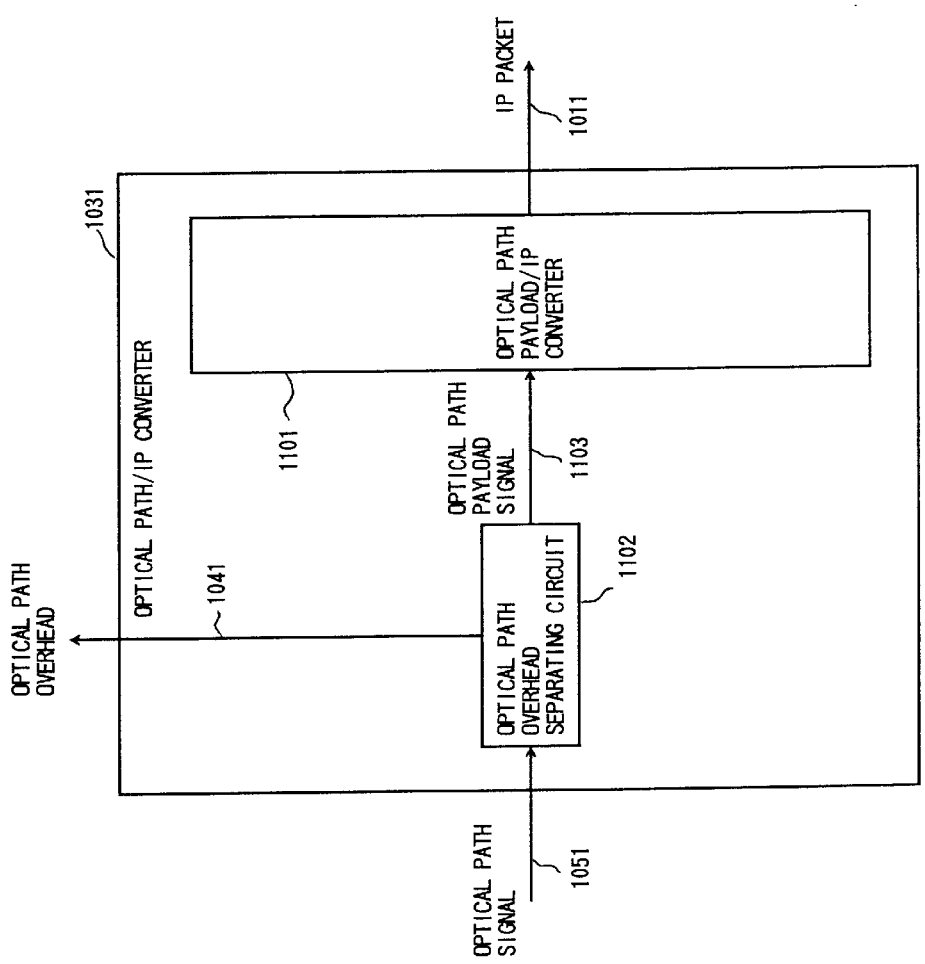
FIG. 9 is a block diagram of an Optical path/IP converter of an IP router according to the first embodiment of the present invention.

In the following, the configuration and the operation of the optical path/IP converter 1031 will be described with reference to FIG. 9. An optical path signal is entered into the optical path/IP converter 1031, and, then, in an optical path overhead separating circuit 1102, the path overhead OPS3 is separated from the optical path signal and the optical path signal is converted into an electrical signal from an optical signal. Since the optical path overhead OPS3 is removed from the optical path signal, only an optical path payload signal is sent out to an optical path payload signal output line 1103 by using an AU pointer.

Then, speed conversion, decoding and so on are performed on the optical path payload signal, and finally IP packets are sent to the IP packet output line 1011 from an optical path payload/IP converter 1101.

Figure 10:
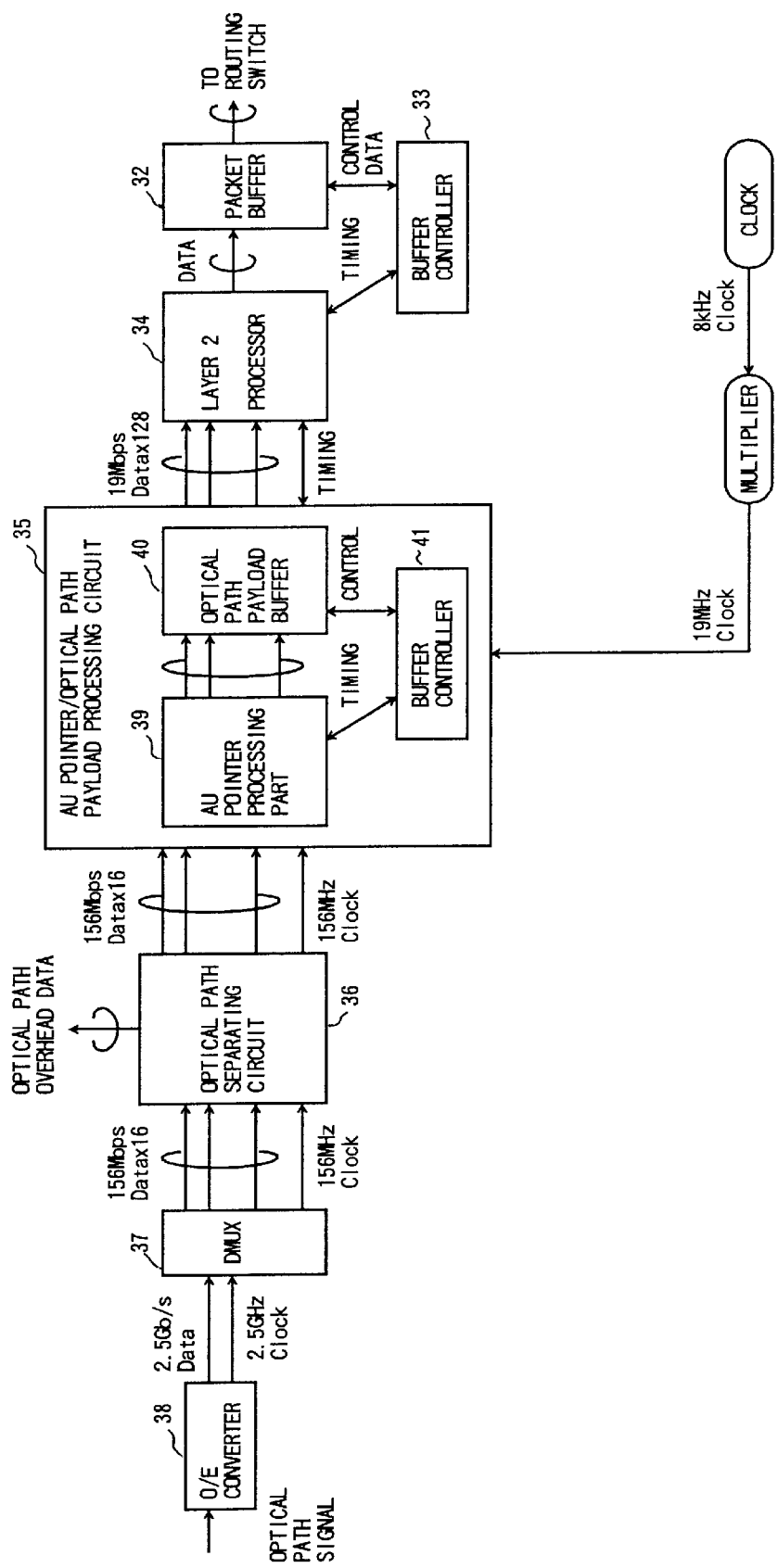
FIG. 10 is a block diagram showing a configuration of the Optical path/IP converter.

FIG. 10 shows in detail the configuration of the optical path/IP converter 1031. As shown in FIG. 10, the optical path/IP converter 1031 includes a packet buffer 32, a buffer controller 33, a layer-2 processor 34, an AU pointer/Optical path payload processing circuit 35, an optical path overhead separating circuit 36, a DMUX 37, and an O/E converter 38. The packet buffer 32, the buffer controller 33, the layer-2 processor 34 and the AU pointer/Optical path payload processing circuit 35 correspond to the Optical path payload/IP converter 1101 in FIG. 9. The Optical path payload/IP converter 1101 can be realized by one or more integrated circuits. The operation will be described below.

The entered optical path signal is converted into an electronic signal, and is divided into a 2.5 Gbps data signal and a 2.5 GHz clock signal. These signals are demultiplexed at the DMUX 37 by parallel/serial conversion, and, then for example, 16 parallel 156 Mbps data signals and 16 parallel 156 MHz clock signals are formed. Next, overhead data is taken off from each optical path signal at the optical path overhead separating circuit 36, and the remaining part is transferred to the AU pointer/optical path payload processing circuit 35. At an AU pointer processing part 39, a process for separating signal units which are multiplexed in the optical path payload area is performed. At the same time, the signal speed may be reduced by increasing the number of parallel data signals according to the processing power of the circuit. In this embodiment, the optical path payload is demultiplexed to 128 parallel signals, and is divided into 16 signal groups each of which has 8 signals.

Then, the parallel optical path payload signals are stored in an optical path payload buffer 40 which is provided to each signal group. The payload signals stored in the optical path payload buffer 40 are sent to the layer-2 processor 34 one after another, and IP packets are extracted from the payload signals. Then, the IP packets are written in the packet buffer 32. Providing 16 layer-2 processors, the same number as the optical path payload buffers, makes it possible to reduce a processing load. According to the processing power, the number of the layer-2 processors may be more than 16 or may be less than 16. The optical path payload buffer 40 smoothes out data speed discrepancies between reading out from the optical path payload buffer 40 by the layer-2 processor and writing in from the AU pointer processing circuit 39. If there is no need to do so, the optical path payload buffer 40 is unnecessary.

The IP packets written in the packet buffer 32 are successively processed in a routing processor (not shown in the FIG. 10) and sent to the routing switch.

According to the embodiment, a plurality of destinations can be connected by using optical paths as connection units, and an IP packet transmission device can be realized which transmits IP packets between IP routers over an OTM signal by mapping the IP packets into the optical path payload. Therefore, high-capacity IP communication can be realized in a cost-effective way, which communication is difficult by the conventional IP-over-SDH technology.

Next, a second embodiment of the present invention will be described in the following. In the second embodiment, a technique for transmitting IP packets effectively by using SDH will be shown.

Figure 11:
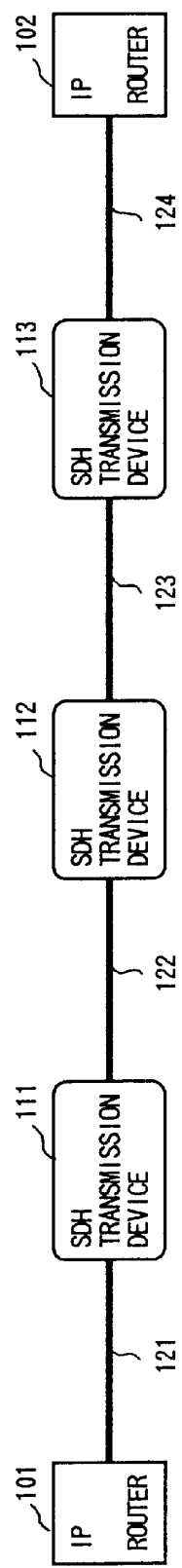
FIG. 11 is a block diagram of an IP packet transmission system according to a second embodiment of the present invention.

FIG. 11 is a diagram showing a transmission system 45 of the second embodiment of the present invention. In the transmission system, two IP routers 101–102 are connected via three SDH transmission devices 111–113 by using an STM signal of SDH. In the embodiment, all IP packets sent from the IP router 101 to a transmission line 121 are transmitted to the IP router 102, and all IP packets sent from the IP router 102 to the transmission line 124 are transmitted to the IP router 101.

At the output part of the IP router, IP packets are mapped into an SDH section payload, and an STM signal which includes an SDH section payload is sent out to the transmission line. Also the IP router receives the SDH section payload from the transmission line and then extracts IP packets from the SDH section payload. Because the transmission of IP packets over SDH is realized without SDH paths in the embodiment of the present invention, the transmission line can be used effectively and high-capacity communication can be realized.

Figure 12:
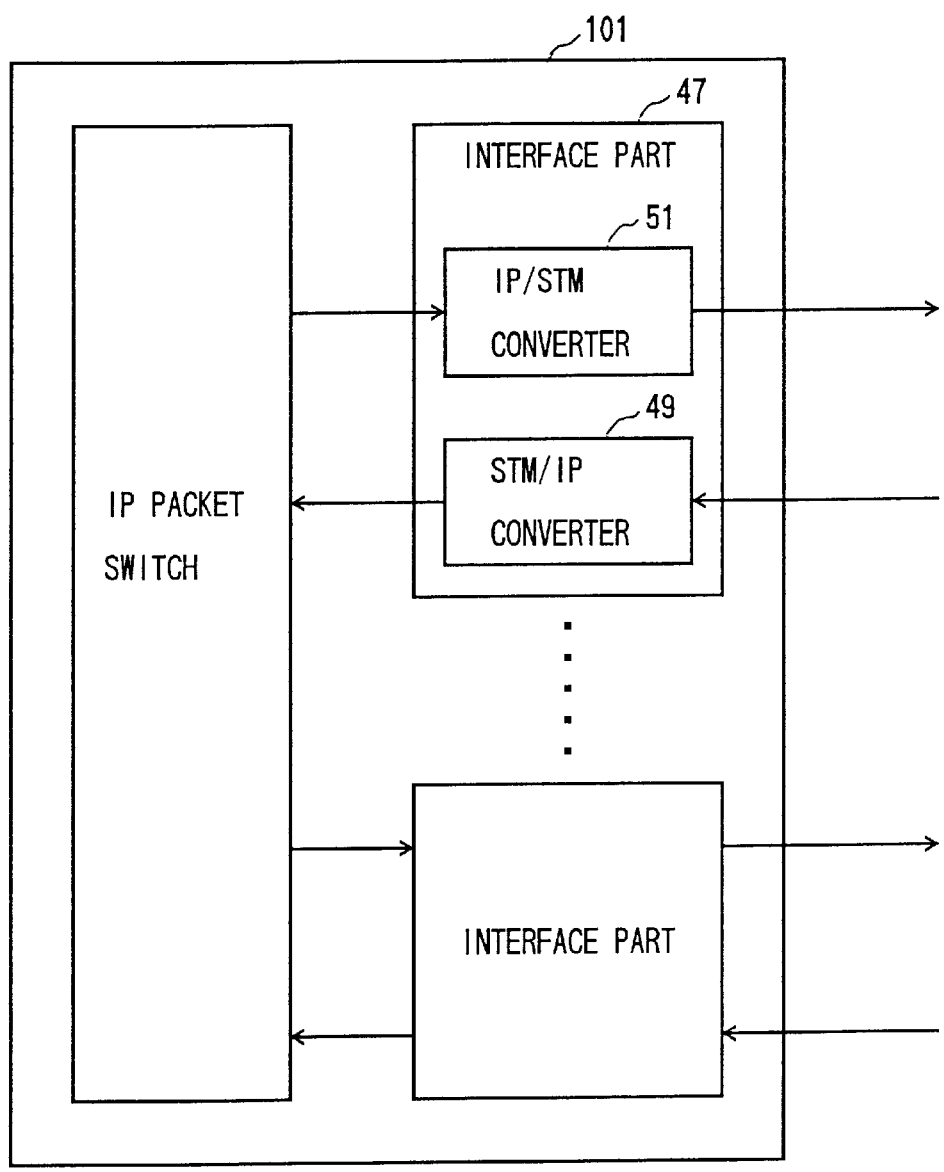
FIG. 12 is a block diagram of an IP packet transmission device according to the second embodiment of the present invention.

FIG. 12 shows the configuration of the IP router 101. The configuration of the router 101 is the same as that of the router 501 shown in FIG. 4 except for the interface part. The interface part 17 is replaced by the interface part 47 in the router 101. The interface part 47 includes an STM/IP converter 49 and an IP/STM converter 51. The operation of the IP router 101 is same as that of the IP router 501 except that IP is converted into STM. Therefore, a description of the operation of the IP router 101 will not be provided.

Figure 13:
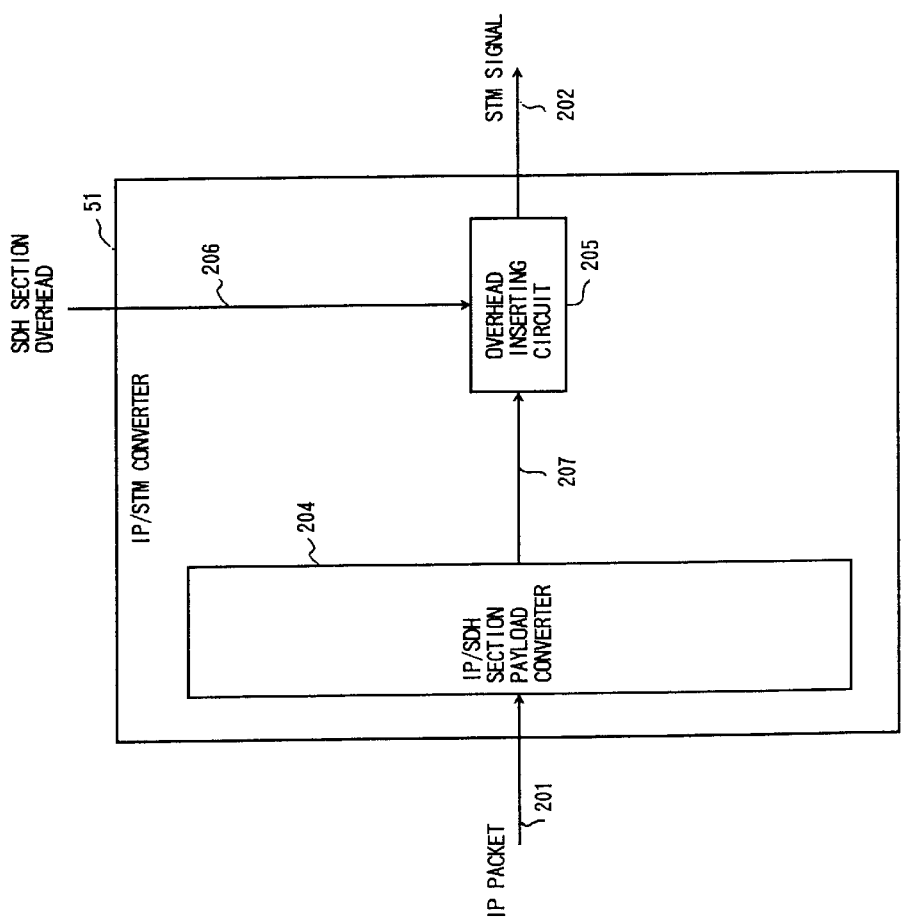
FIG. 13 is a block diagram of an IP/STM converter of an IP router according to the second embodiment of the present invention.

FIG. 13 is a block diagram of the IP/STM converter 51. As shown in the figure, the IP/STM converter 51 has an IP/SDH section payload converter 204 and an overhead inserting circuit 205. The IP/SDH section payload converter 204 maps IP packets entered from an IP packet input line 201 into an SDH section payload by writing the IP packets into the SDH section payload area within an STM-N frame.

Figure 14:
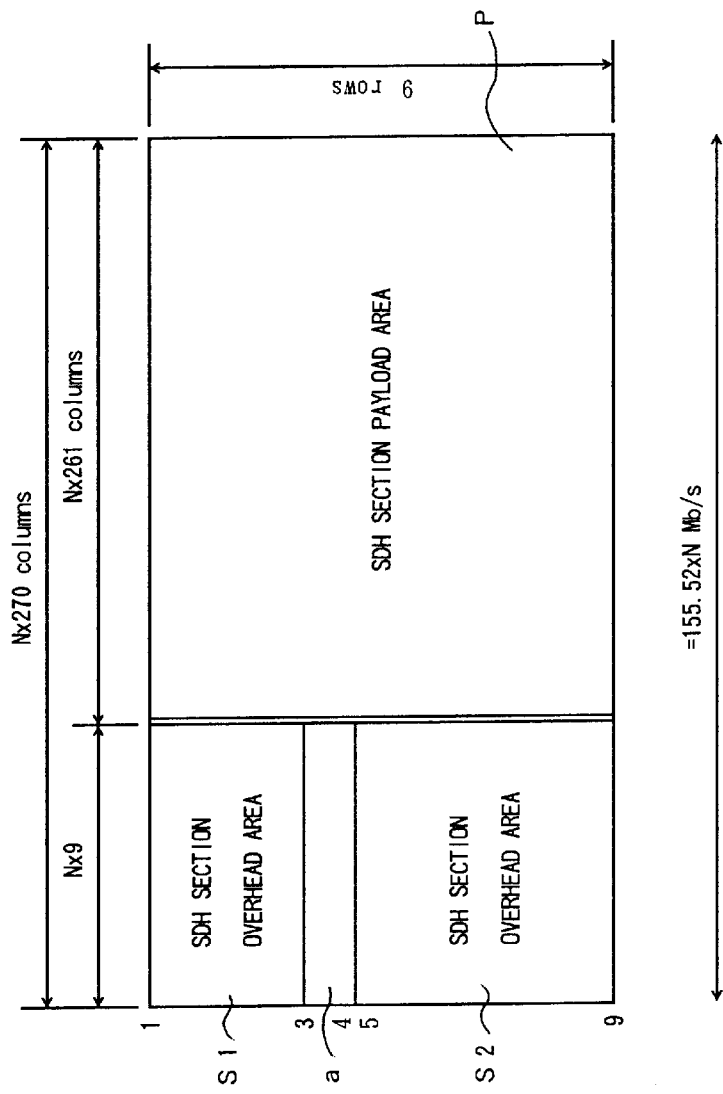
FIG. 14 is a diagram of an STM-N frame of SDH.

As shown in FIG. 14, the STM-N frame consists of a data stream of 9×(270×N) bytes, and the data stream is divided into an SDH section overhead area S1 (3×(9×N) bytes), an SDH section overhead area S2 (5×(9×N) bytes), an AU pointer area "a" (1×(9×N) bytes) and an SDH section payload area P (9×(261×N) bytes).

In the IP/SDH section payload converter 204, the mapping is realized by, for example, copying IP packets just as they are, after speed conversion and error correcting encoding, into a digital data stream at a speed of 9×(261×N) ×64 kbps, which speed is the same as the speed of the 35 SDH section payload area. Those processes are performed by using the above-mentioned PPP.

In the FIG. 13, the SDH section payload signals sent to an output line 207 from the IP/SDH section payload converter 204 are transferred to an SDH section overhead inserting circuit 205. In the SDH section overhead inserting circuit 205, the SDH section overhead signals (Si, S2) which are input from an SDH section overhead data input line 206 and generated within the overhead inserting circuit 205 are added, and an AU pointer (a) which shows the phase difference between the phase of the STM-N frame and the SDH section payload is added. Then, an STM signal is completed and sent out to an STM signal output line 202.

Figure 15:
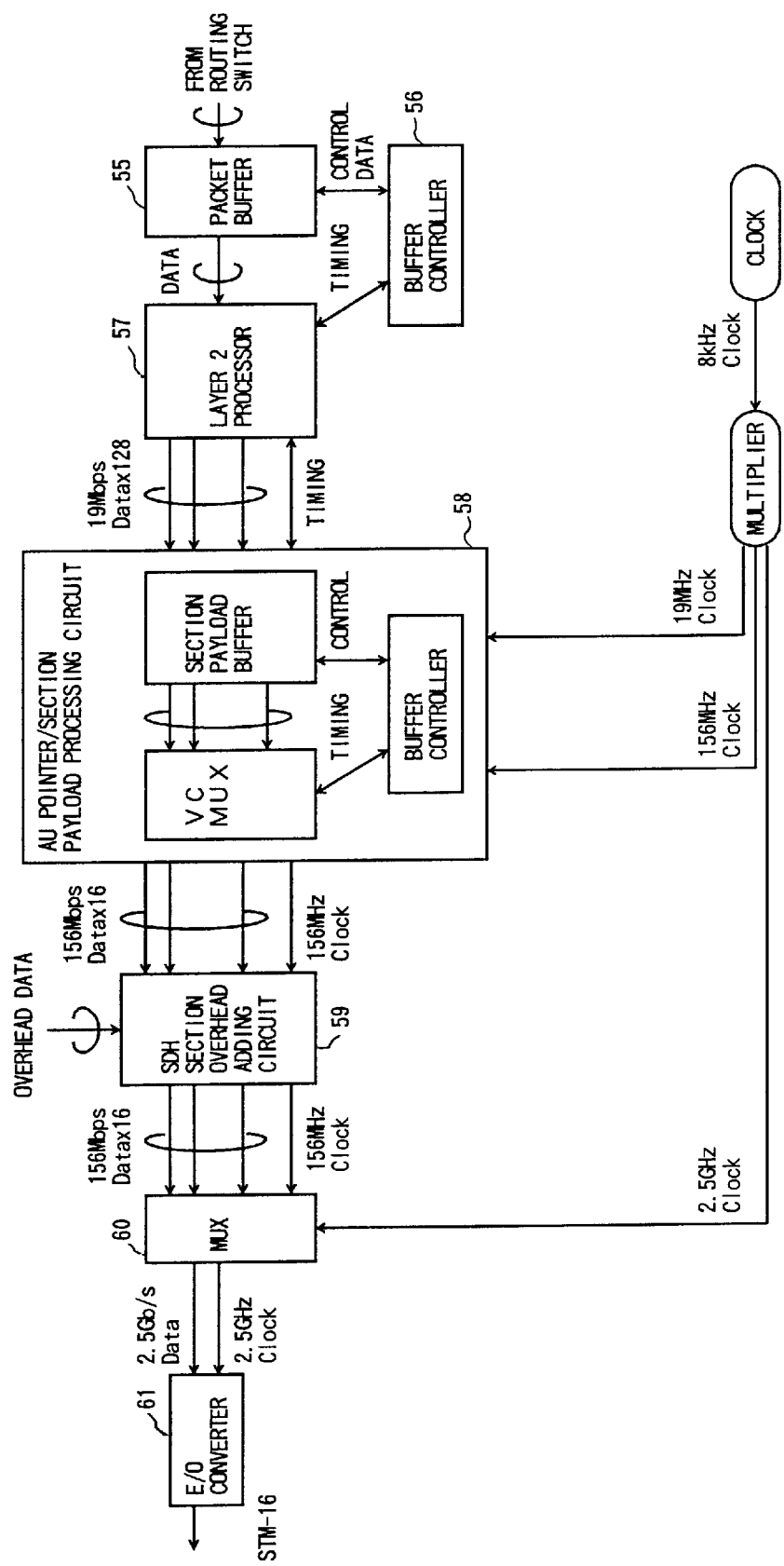
FIG. 15 is a block diagram showing a configuration of the IP/STM converter.

FIG. 15 shows the IP/STM converter 51 in detail. As shown in FIG. 15, the IP/STM converter 51 has a packet buffer 55, a buffer controller 56, a layer-2 processor 57, an AU pointer/Section payload processing circuit 58, an SDH section overhead adding circuit 59, a MUX 60, and an E/O converter 61. The packet buffer 55, the buffer controller 56, the layer-2 processor 57 and the AU pointer/Section payload processing circuit 58 correspond to the IP/SDH section payload converter 204 in FIG. 13. The IP/STM converter 51 can be realized by one or more integrated circuits. The operation of the IP/STM converter 51 is the same as that of the IP/Optical path converter mentioned above with reference to FIG. 7, except that, in the IP/STM converter 51, a section overhead is added to a section payload at the SDH section overhead adding circuit 59 and then an STM-16 signal is sent out to a line.

Next, the STM/IP converter 49 in the interface part 47 shown in FIG. 12 will be described in the following.

Figure 16:
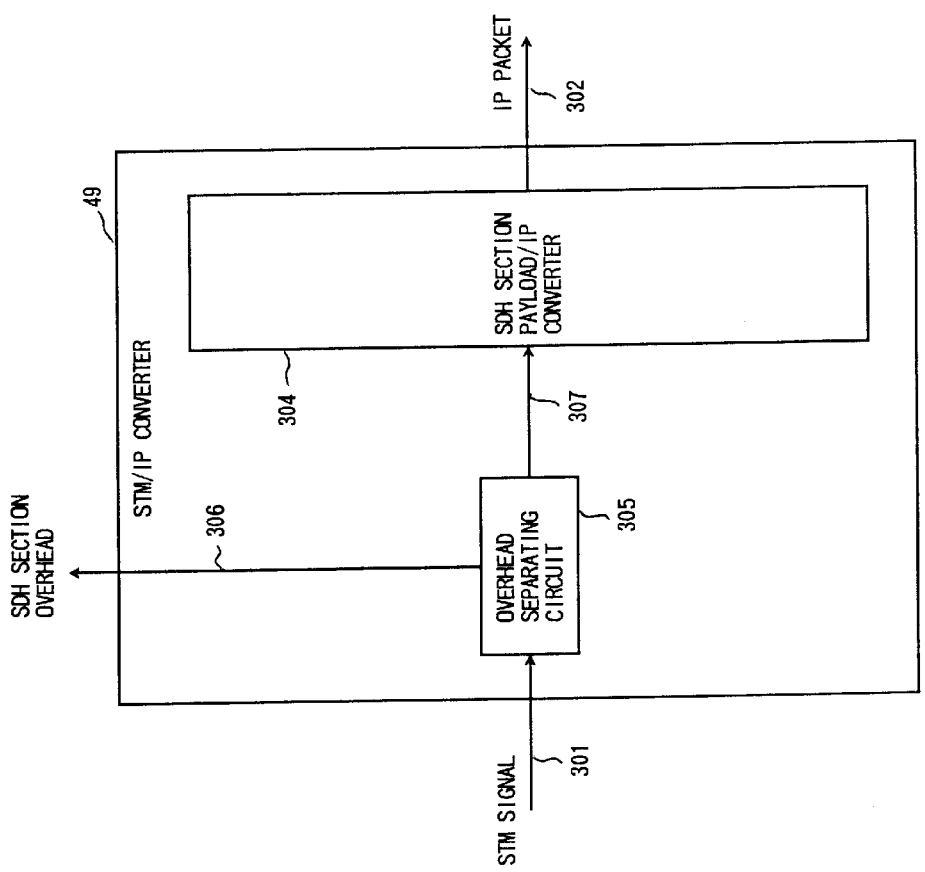
FIG. 16 is a block diagram of an STM/IP converter of an IP router according to the second embodiment of the present invention.

In the STM/IP converter 49, IP packets are retrieved from an STM signal. As shown in FIG. 16, the STM signal is entered into the STM/IP converter 49, and, then, in an SDH section overhead separating circuit 305, the SDH section overhead is separated from the STM signal and the remaining SDH section payload signal is sent out to an output line 307.

Then, some processes such as speed conversion, decoding and so on are performed on the section payload signal, and finally IP packets are sent to an IP packet output line 302 from an SDH section payload/IP converter 304.

Figure 17:
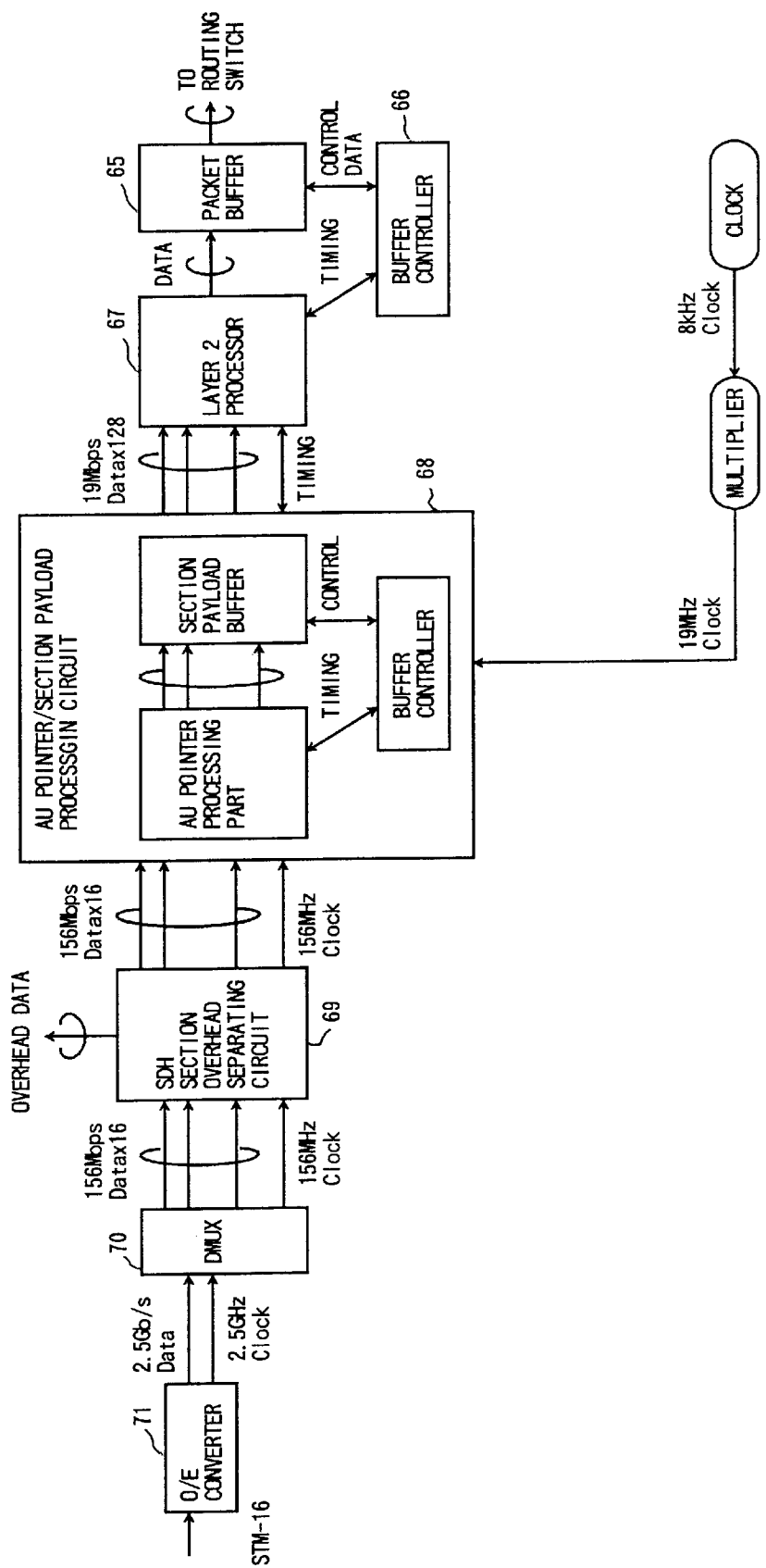
FIG. 17 is a block diagram showing a configuration of the STM/IP converter.
Figure 18:
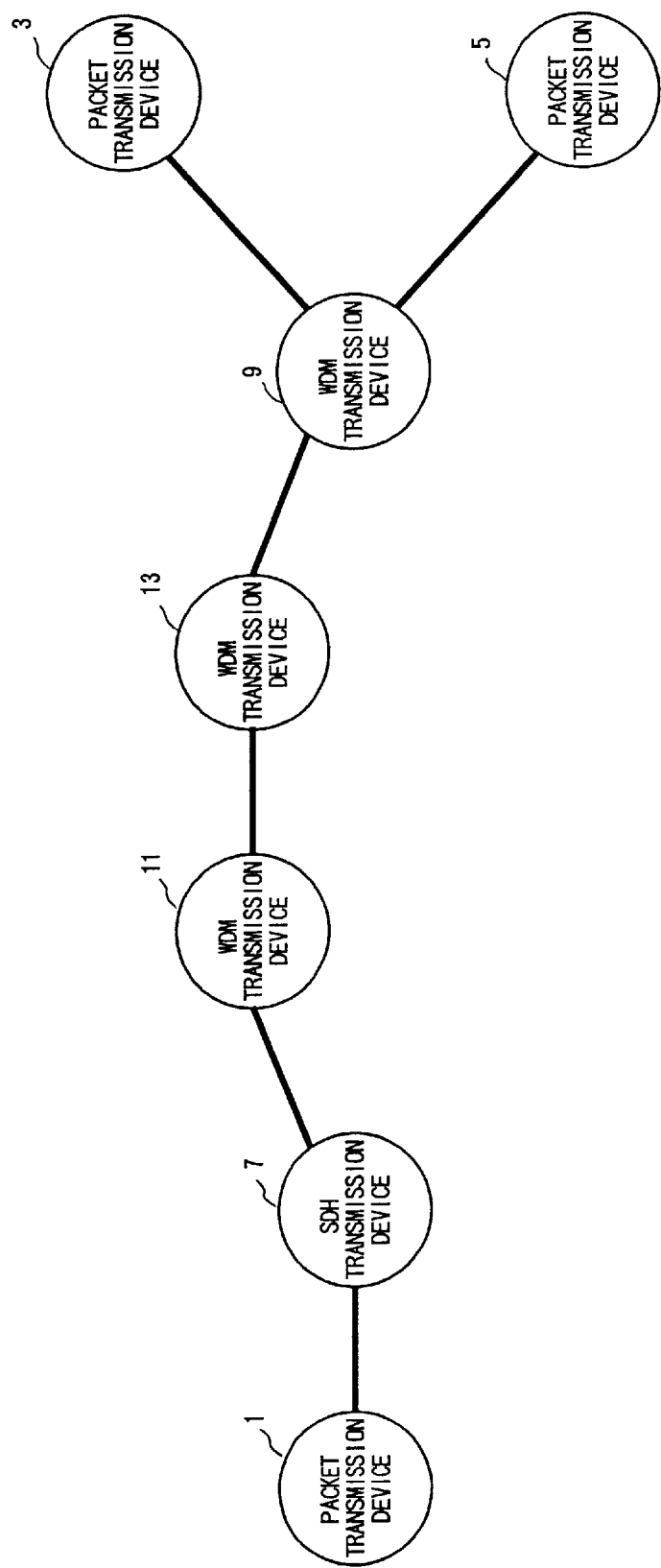
FIG. 18 is a diagram showing a system configuration in which IP packets are transmitted by WDM in a conventional technology.
Figure 19:
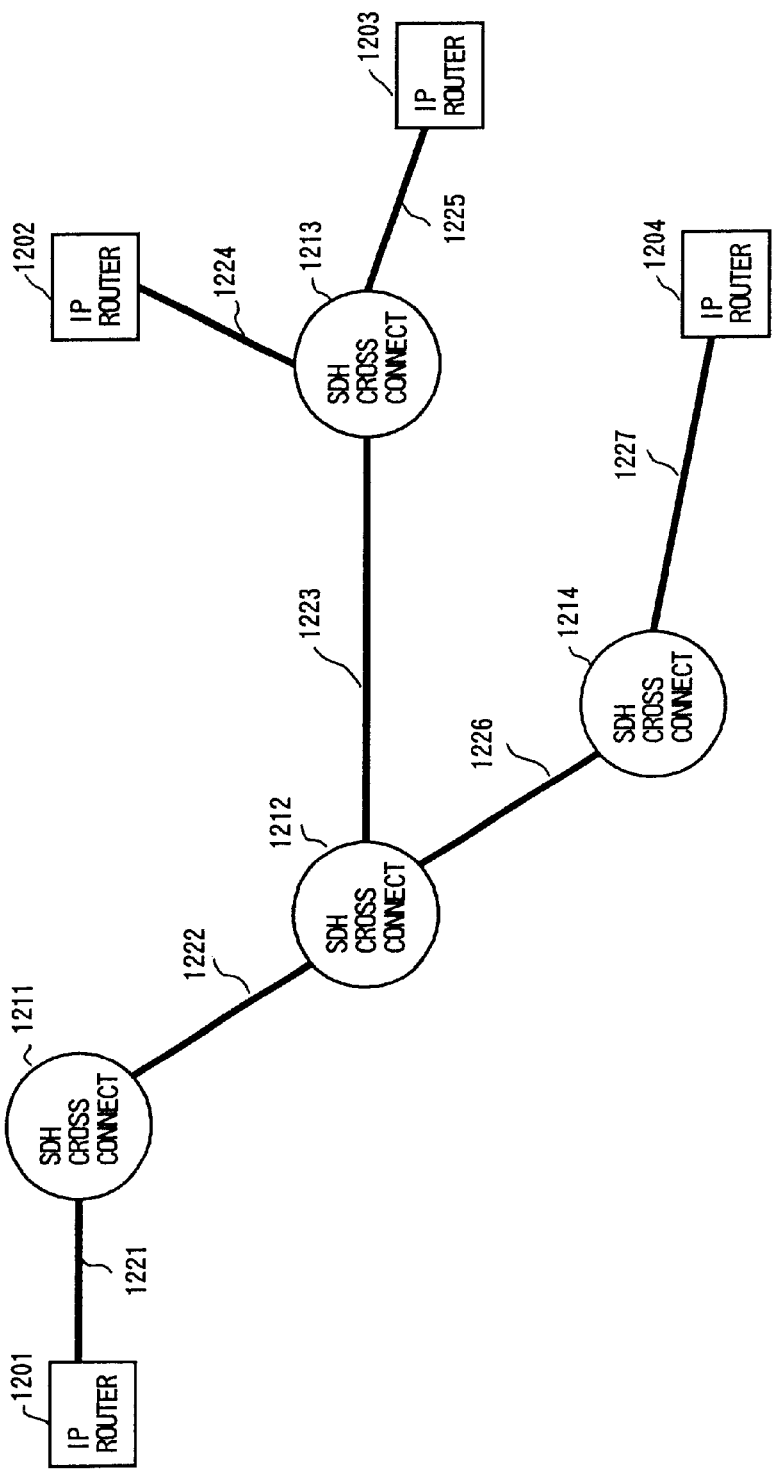
FIG. 19 is a block diagram showing a system configuration in which a conventional IP-over-SDH technology is used.
Figure 20:
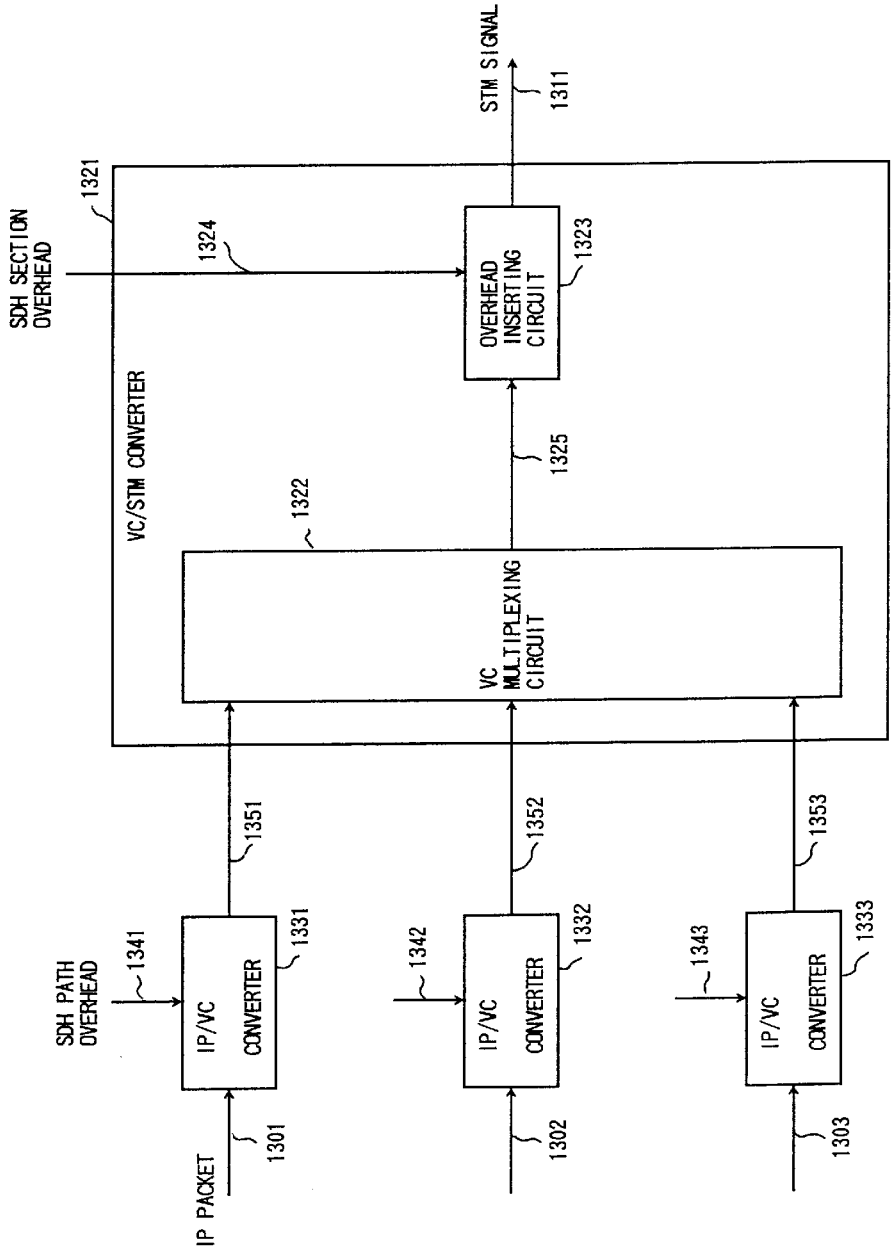
FIG. 20 is a block diagram showing a configuration of an IP/STM converter of a conventional IP router.
Figure 21:
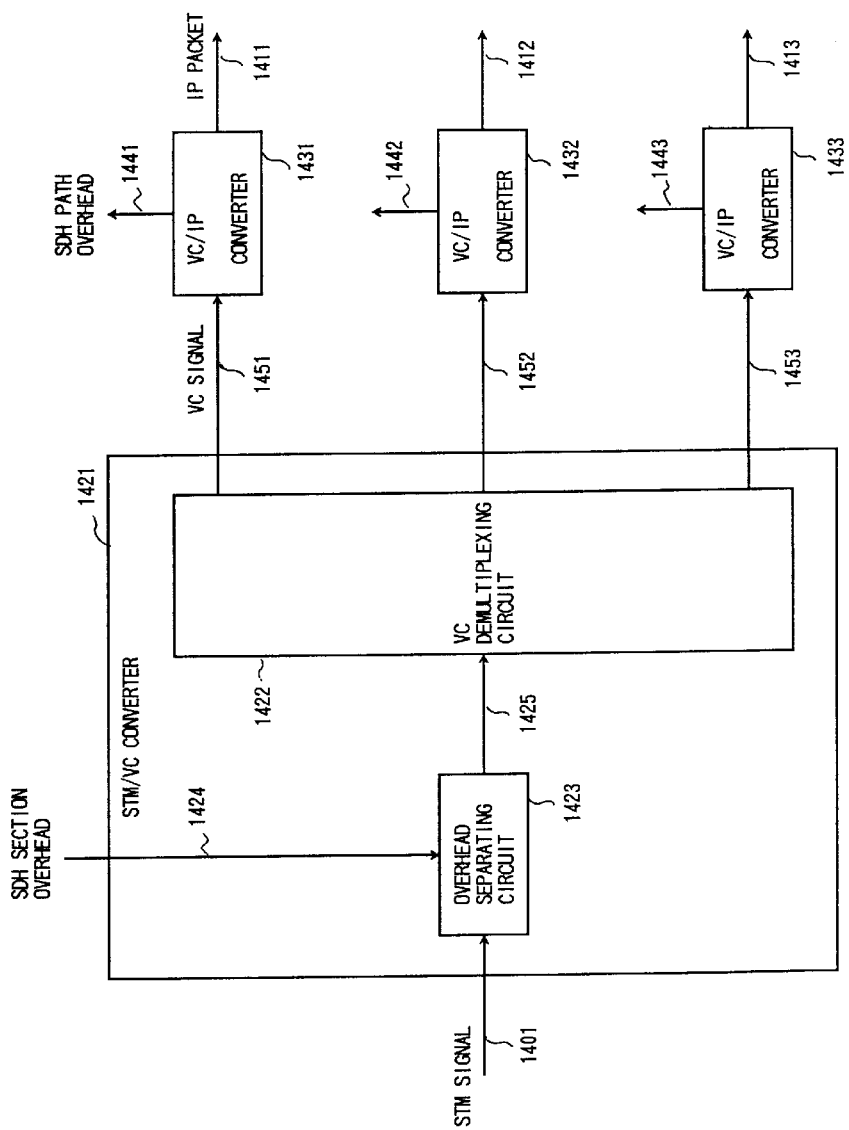
FIG. 21 is a block diagram showing a configuration of an STM/IP converter of a conventional IP router.

FIG. 17 shows in detail the configuration of the STM/IP converter 49. As shown in FIG. 17, the STM/IP converter 49 includes a packet buffer 65, a buffer controller 66, a layer-2 processor 67, an AU pointer/Optical path payload processing circuit 68, an SDH section overhead separating circuit 69, a DMUX 70, and an O/E converter 71. The packet buffer 65, the buffer controller 66, the layer-2 processor 67 and the AU pointer/Section payload processing circuit 68 correspond to the SDH section payload/IP converter 304 in FIG. 16.

The operation of the STM/IP converter 49 is the same as that of the Optical path/IP converter mentioned above with reference to FIG. 10, except that, in the STM/IP converter 49, an STM-16 signal is entered and SDH section overhead data is separated from the STM-16 signal at the SDH section overhead separating circuit 69.

According to this embodiment, because IP packets are mapped directory into the SDH section payload area without VC, information for handling the VC can be eliminated and more IP packets may be mapped into the SDH section payload area as compared to the conventional data mapping methods such as the one disclosed in WO94/03004 and the conventional IP-over-SDH. Therefore, a high-capacity communication becomes possible.

As described above, according to the present invention, it becomes possible to provide a transmission device which can transmit IP packets over an OTM signal, by mapping the IP packets into the optical path signal directly, without using an other medium such as an SDH path, and to construct packet transmission system in which connections between a plurality of destinations are established by using an optical path as a connection unit. Therefore, a high-capacity IP packet communication can be realized, which communication is difficult by conventional IP-over-SDH technologies. Further, because other devices such as SDH transmission devices can be eliminated when transmitting IP packets over an OTM signal, the high-capacity IP packet communication can be realized economically.

Further, by using the technique of the present invention in which IP packets are directly mapped into an SDH section payload, the waste of the SDH path overhead area can be eliminated. The elimination is effective especially when the destination of the IP packets is limited to only one.

Furthermore, the packet transmission device and the packet transmission system according to the present invention have the remarkable effect of realizing high-capacity communication between endpoints, especially with IP.

Each embodiment described above is an example. Therefore, the present invention may be applicable to packets of, for example, SNA, X.25 and frame relay, other than IP. The embodiments are described by taking SDH as an example, because SDH is the international standard specification (ITU-T G.707–G.709) of digital data transmission. Because SDH is substantially the same as SONET, the present invention is applicable to SONET as a matter of course. In addition, the present invention may be applicable to other digital data transmission specifications. Further, the first embodiment was described by taking the optical path signal format as shown in FIG. 3 as an example, but it is obvious that the present invention is applicable to other formats. Furthermore, the present invention is applicable to various devices and various systems, other than an IP router, so long as the devices and the systems transmit packets.

The present invention is not limited to the specifically disclosed embodiments, and variations and modifications may be made without departing from the scope of the invention.

What is claimed is:

1. A circuit for converting packets into an optical path signal, the circuit being used in a transmission device for transmitting packets, and the packets arriving at irregular intervals and being electrically processed in the circuit, the circuit comprising:

a converting arrangement for converting the packets into a plurality of continuous data streams by performing a data link layer process;

a multiplexing arrangement for multiplexing the data streams to generate optical path payload data;

an adding arrangement for adding overhead data to the optical path payload data; and an electrical-to-optical converting arrangement for converting the optical path payload data with the overhead data into the optical path signal.

2. The circuit as claimed in claim 1, wherein the packets are IP packets which are used for realizing a communication by the Internet Protocol.

3. A circuit for converting an optical path signal into packets, the circuit being used in a transmission device for transmitting packets, and wherein the packets are processed electrically in the circuit and are sent at irregular intervals, the circuit comprising:

an optical-to-electrical converting arrangement for converting the optical path signal into electrical data, a separating arrangement for separating overhead data from the optical path signal to generate optical path payload data;

a generating arrangement for generating continuous data streams by demultiplexing the optical path payload data; and an extracting arrangement for extracting the packets from the continuous data streams by performing a data link layer process.

4. The circuit as claimed in claim 3, wherein the packets are IP packets which are used for realizing a communication by the Internet Protocol.

5. A transmission device for transmitting packets by using optical path signals, wherein the packets are processed electrically in the transmission device and arrive at irregular intervals, the transmission device comprising a first circuit and a second circuit;

the first circuit comprising:
a converting arrangement for converting the packets into a plurality of continuous data streams by performing a data link layer process;
a multiplexing arrangement for multiplexing the data streams to generate optical path payload data;
an adding arrangement for adding overhead data to the optical path payload data;
an electrical-to-optical converting arrangement for converting the optical path payload data with the overhead data into the optical path signal; and
a sending arrangement for sending the optical path signal by using wavelength division multiplexing (WDM) transmission;

the second circuit comprising:
an optical-to-electrical converting arrangement for converting a received optical path signal into electrical data;
a separating arrangement for separating overhead data from the received optical path signal to generate optical path payload data;
a generating arrangement for generating continuous data streams by demultiplexing the optical path payload data; and
an extracting arrangement for extracting packets from the continuous data streams by performing a data link layer process.

6. A transmission system comprising a plurality of transmission devices for transmitting packets by using optical path signals, the packets being processed electrically in the transmission device and arriving or being sent at irregular intervals, each of the transmission devices comprising:

a first circuit including:
a converting arrangement for converting the packets into a plurality of continuous data streams by performing a data link layer process;
a multiplexing arrangement for multiplexing the data streams to generate optical path payload data;
an adding arrangement for adding overhead data to the optical path payload data;
an electrical-to-optical converting arrangement for converting the optical path payload data with the overhead data into the optical path signal; and
a sending arrangement for sending the optical path signal by using wavelength division multiplexing (WDM) transmission;

a second circuit including:
an optical-to-electrical converting arrangement for converting a received optical path signal into electrical data;
a separating arrangement for separating overhead data from the received optical path signal to generate optical path payload data;
a generating arrangement for generating continuous data streams by demultiplexing the optical path payload data; and
an extracting arrangement for extracting packets from the continuous data streams by performing a data link layer process.

7. The transmission system as claimed in claim 6, wherein the packets are IP packets which are used for realizing a communication by the Internet Protocol.

8. A method for converting packets into an optical path signal, the method being used in a transmission device for transmitting packets, and the packets arriving at irregular intervals and being electrically processed in the transmission device, the method comprising:

converting the packets into a plurality of continuous data streams by performing a data link layer process;

multiplexing the data streams to generate optical path payload data;

adding overhead data to the optical path payload data; and converting the optical path payload data with the overhead data into the optical path signal by performing an electrical to optical conversion process.

9. A method for converting an optical path signal into packets, the method being used in a transmission device for transmitting packets, and the packets being processed electrically in the transmission device and being sent at irregular intervals, the method comprising:

converting the optical path signal into electrical data;

separating overhead data from the optical path signal to generate optical path payload data;

generating continuous data streams by demultiplexing the optical path payload data; and extracting the packets from the continuous data streams by performing a data link layer process.

* * * * *